(12) United States Patent
Eads

(10) Patent No.: US 9,547,830 B2
(45) Date of Patent: Jan. 17, 2017

(54) SCALABLE, MEMORY-EFFICIENT MACHINE LEARNING AND PREDICTION FOR ENSEMBLES OF DECISION TREES FOR HOMOGENEOUS AND HETEROGENEOUS DATASETS

(71) Applicant: WISE IO, INC., Berkeley, CA (US)

(72) Inventor: Damian Ryan Eads, San Francisco, CA (US)

(73) Assignee: WISE.IO, INC., Berkeley, CA (US)

( * ) Notice: Subject to any disclaimer, the term of this patent is extended or adjusted under 35 U.S.C. 154(b) by 497 days.

(21) Appl. No.: 14/272,263

(22) Filed: May 7, 2014

(65) Prior Publication Data

US 2014/0337269 A1 Nov. 13, 2014

Related U.S. Application Data

(60) Provisional application No. 61/820,358, filed on May 7, 2013.

(51) Int. Cl.
*G06N 5/02* (2006.01)
*G06N 99/00* (2010.01)

(52) U.S. Cl.
CPC .............. *G06N 99/005* (2013.01); *G06N 5/02* (2013.01)

(58) Field of Classification Search
None
See application file for complete search history.

(56) References Cited

U.S. PATENT DOCUMENTS 5,428,722 A * 6/1995 Marsh .................... G06T 17/00
345/619
2014/0337255 A1 11/2014 Eads

OTHER PUBLICATIONS

Chaiken et al, Directory-Based Cache Coherence in Large-Scale Multiprocessors, 1990.*
Koshy et al, Optimizing Embedded Virtual Machines, 2009.*
Shi et al, Virtual Machien Showdown: Stack Versus Registers, 2005.*
Breiman, Leo, Random Forests, University of California Berkeley, Jan. 2001.

* cited by examiner

*Primary Examiner* — Stanley K Hill
*Assistant Examiner* — Mikayla Chubb
(74) *Attorney, Agent, or Firm* — Lazaris IP

(57) ABSTRACT

Optimization of machine intelligence utilizes a systemic process through a plurality of computer architecture manipulation techniques that take unique advantage of efficiencies therein to minimize clock cycles and memory usage. The present invention is an application of machine intelligence which overcomes speed and memory issues in learning ensembles of decision trees in a single-machine environment. Such an application of machine intelligence includes inlining relevant statements by integrating function code into a caller's code, ensuring a contiguous buffering arrangement for necessary information to be compiled, and defining and enforcing type constraints on programming interfaces that access and manipulate machine learning data sets.

34 Claims, 17 Drawing Sheets

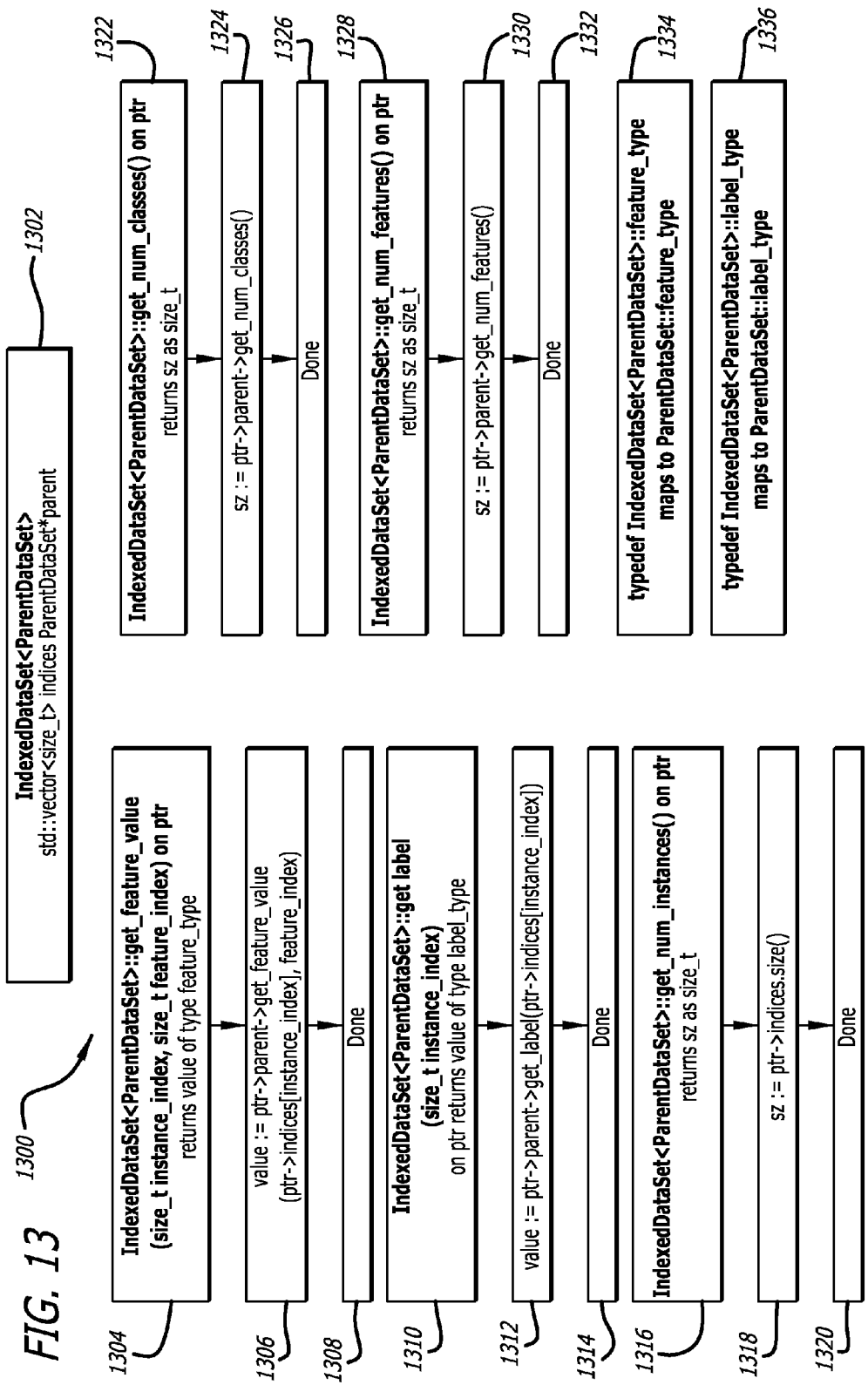

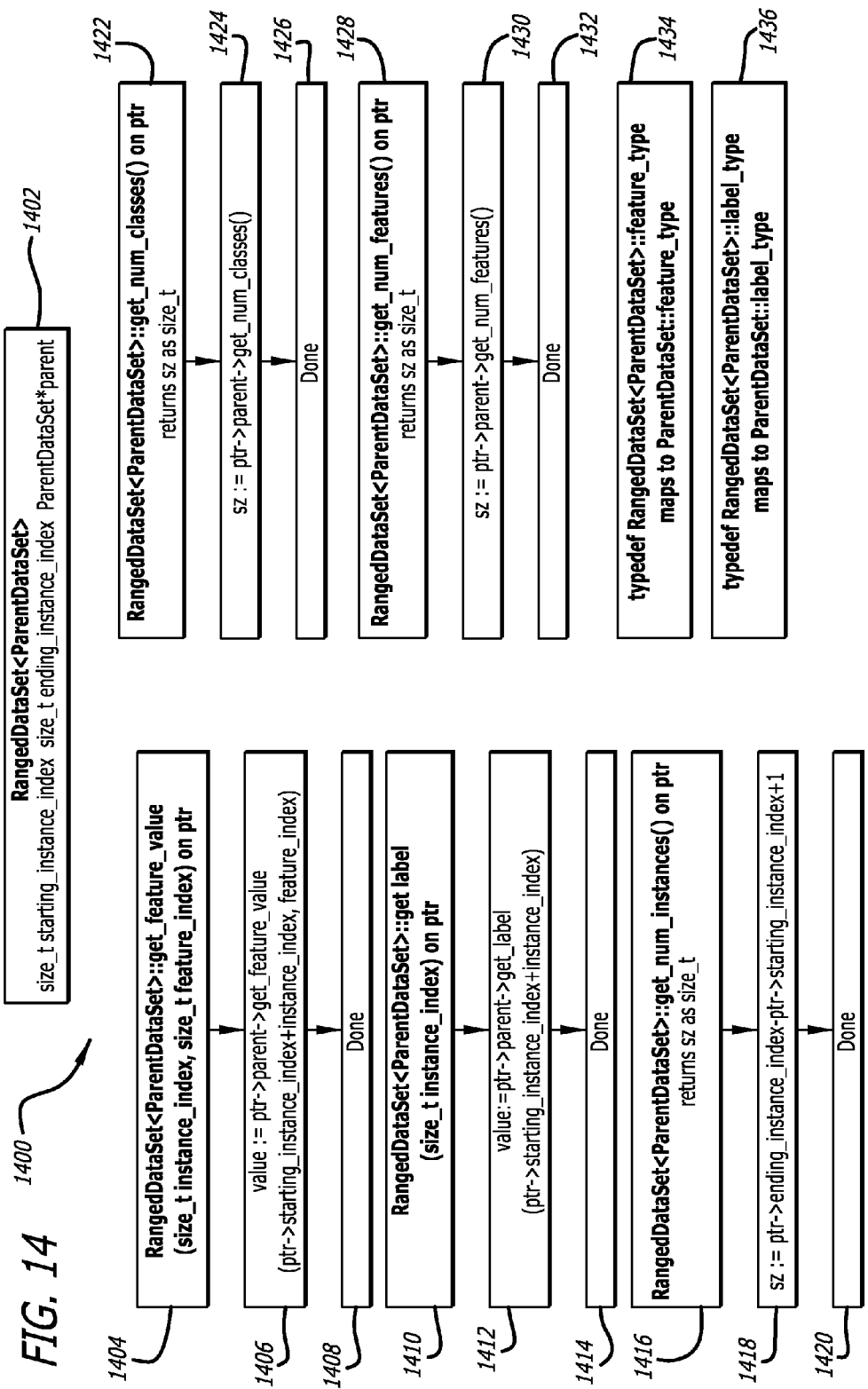

SCALABLE, MEMORY-EFFICIENT MACHINE LEARNING AND PREDICTION FOR ENSEMBLES OF DECISION TREES FOR HOMOGENEOUS AND HETEROGENEOUS DATASETS

CROSS-REFERENCE TO RELATED PATENT APPLICATIONS

This patent application claims priority to U.S. provisional application 61/820,358, filed on May 7, 2013, the contents of which are incorporated in their entirety herein.

FIELD OF THE INVENTION

The present invention relates to machine intelligence. Specifically, the present invention relates to a method and system of scaling machine learning and prediction to very large data sets comprised of homogeneous and heterogeneous datasets in which manipulation of computer architecture is applied in various techniques to efficiently utilize available memory and minimize limitations on accuracy and speed of data processing.

BACKGROUND OF THE INVENTION

There are many existing implementations of machine intelligence. Learning ensembles of decision trees is a popular method of machine learning, and one such implementation, known as Random Forests, are a combination of several decision trees. Decision trees permit the use of multiple types of data that do not need to be normalized. Random Forests have been specifically defined as a combination of tree predictors such that each tree is learned on a random sample of the instances for all trees in the forest.

Despite the popularity of machine intelligence implementations such as Random Forests™, there are a number of inherent limitations which discourage practical application to very large data sets. These types of traditional analytics tools often fall flat, since they cannot function properly with large, high-dimensional, complicated data sets, particular as data sizes become very large, and also because of the frequent presence of difference data formats and types. There are many Random Forest, permutations in the existing art, but they suffer from an inability to take full advantage of intricate computer architecture environments in which they are tasked to make sense out of these immense data populations in an efficient manner.

As the global economy relies more and more on rapid data-driven analytics, there is an immediate need, unrealized by existing implementations, for fast, scalable, and easy-to-use machine intelligence that can perform accurate prediction and extract deep and meaningful insight out of large data sets. There is a further need for fast, scalable, and easy-to-use machine intelligence that can accomplish these tests with both homogeneous data sets as well as with heterogeneous data sets comprised of both numeric and non-numeric data.

It is therefore one objective of the present invention to provide a machine intelligence framework that is efficient, accurate, and fast. It is a further objective of the present invention to provide such a framework in a common, single-computer implementation in which both machine learning and machine prediction are scalable to arbitrarily large data sets. It is yet another objective of the present invention to provide such a framework for large data sets that are comprised of homogeneous and heterogeneous sets of data.

BRIEF SUMMARY OF THE INVENTION

The present invention is an application of machine intelligence which overcomes speed and accuracy issues in groups of decision trees known as Ensembles of Decision Trees (which may herein be also referred to as "EDTs") by applying a systematic process through a plurality of computer architecture manipulation techniques. These techniques take unique advantage of computer architecture efficiencies to minimize clock cycles and memory usage that slow down big data analytics. In one aspect, the objectives identified above are achieved by utilizing inlining procedures to efficiently manage contents of registers to reduce function call overhead from excessive clock cycles, configuring information to be compiled in one or more contiguous buffers to improve cache coherency, and applying principles of static polymorphism using one or more dataset concepts to implement functions that minimize inheritance from dynamic dispatch overhead. The present invention therefore implements several techniques used in the practice of computer vision to extract a much faster response from computer architecture than previously contemplated in the existing art. The present invention can also be thought of as applying type constraints on programming interfaces that access and manipulate machine learning data sets to optimize available memory usage hampered by unnecessary data copying and minimize speed limitations resulting from so-called cache misses, function call overhead, and excessive processing time from performing multiple if/then conditional statements.

The present invention applies these computer architecture manipulation techniques across both training and prediction modes of operation in Random Forest implementations. Training involves learning a forest of decision trees from labeled feature vectors, and prediction takes a learned model based on the training set and generates predictions on a new set of data. Within these two modes, the techniques disclosed in the present invention address the two main functions, classification and regression, of processing data that lead to memory efficiency issues and speed constraints as noted above.

Other embodiments, features and advantages of the present invention will become apparent from the following description of the embodiments, taken together with the accompanying drawings, which illustrate, by way of example, the principles of the invention.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

FIG. 13 is a conceptual flow diagram illustrating a class implementation for use of inlining to index instances of another data set object to enable memory-efficient subsampling and computational reductions within a MLDataSet concept according to the present invention; and FIG. 14 is a conceptual flow diagram illustrating a class implementation for a contiguous partition of instances within another data set to enable memory-efficient within a MLDataSet concept according to the present invention.

DETAILED DESCRIPTION OF THE INVENTION

Figure 1A:
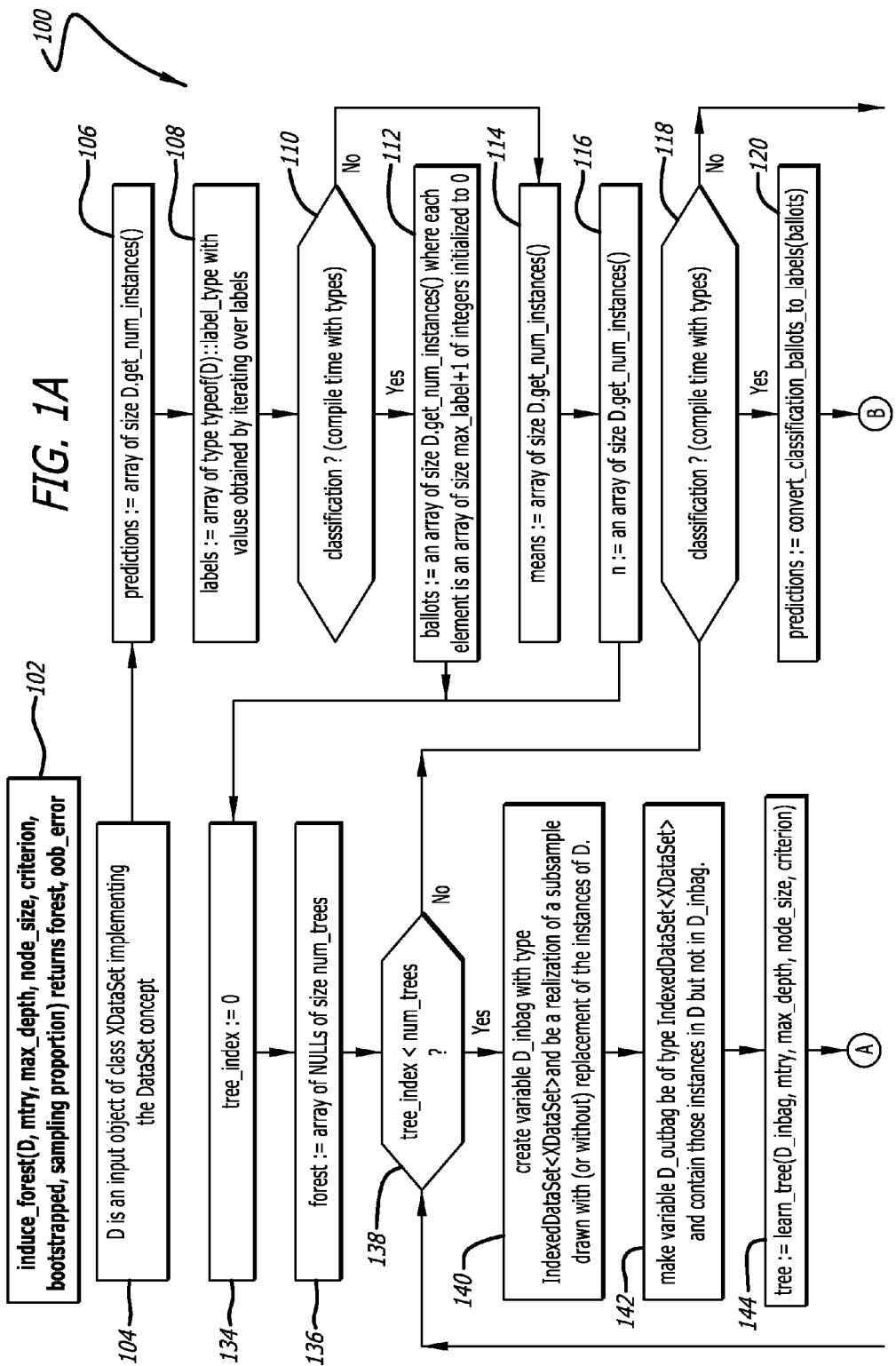
FIG. 1 is a flow diagram representing steps in inducing a forest in the processing of learning a decision forest for homogeneous datasets according to one embodiment of the present invention.

In the following description of the present invention reference is made to exemplary embodiments illustrating the principles of the present invention and how it is practiced. Other embodiments will be utilized to practice the present invention and structural and functional changes will be made thereto without departing from the scope of the present invention.

The present invention provides approaches to implementing a learning ensemble of decision trees in a single-machine environment in which inlining to optimize relevant material for compilation by integrating function code into a caller's code at compilation, ensuring a contiguous buffer arrangement for necessary information to be compiled, and configuring one or more mechanisms for defining and enforcing constraints on types, known as C++ concepts, are techniques utilized to maximize memory usage and minimize speed constraints. Each of these applications is discussed in further detail herein. Each of inlining, buffer contiguity, and C++ concepts, when combined and applied to a learning ensemble of decision trees, represents an enhancement of processing speed and memory usage in analyzing large data sets in a time-effective and cost-effective manner.

In machine intelligence, there are two general modes of operation: training (or learning) and prediction (or testing). Training involves learning a forest of decision trees from labeled feature vectors, and prediction takes a learned model based on the training set and generates predictions on a new set of data. Within these two modes, there are two kinds of prediction: classification and regression. A training set of data is a group of n pairs $(x_1, y_1), (x_2, y_2), \ldots, (x_n, y_n)$ where $x_i$ is a vector (or, feature vector) representing the input variables (or, features) and y represents the output variable (or, label). A (label, feature vector) pair is referred to as an "instance." The $x_{ij}$ value is known as a feature and the integer j that identifies a feature dimension is called a feature index. The length of $x_i$ is referred to as the feature dimension. An unlabeled data set is group of feature vectors $x_1, x_2, \ldots, x_n$ without any labels associated with them.

A decision tree is a data structure used to predict an output variable from an input set of variables. The variables can be real-valued (e.g., the price of a used car), Boolean (e.g. whether the car has been in accident or not), or categorical (e.g. the make of the car). When the output variable is Boolean or categorical, we say the decision tree is a classification tree; when this output variable is real-valued, we say the decision tree is a regression tree.

At a particular tree node, a Splitting Test is applied to instances given to the tree node. In the case of integer/ordinal and real-valued features, a thresholding is applied. If a real-valued or integer feature is below a threshold value, the test passes, otherwise, it fails. For categorical features, a categorical feature value is checked for membership to a subset of category indices. If it belongs, the test passes. Otherwise, it fails.

A Decision Tree Node encodes the following information:
Node Left Child: a handle to the left node for a non-leaf node or a sentinel value for a leaf node.
Node Right Child: a handle to the right node for a non-leaf node or a sentinel value for a leaf node.
Node Feature Index: the feature index or feature indices (represented by a collection of feature indices) that is/are needed to apply the test.
Node Test Parameters: the parameterization of the test, if any.
Node Threshold: the threshold (real-valued and integer features) or container of category indices representing a subset (categorical features) used for the test for non-leaf nodes. This value is a special sentinel value if the tree node is a node.
Node Label: the label to predict for a leaf node or a sentinel value for a non-leaf node.
Node Uncertainty Parameters: optional uncertainty parameters for a leaf node or a sentinel value for a non-leaf node.
Node UID: an optional unique identifier.

The process for predicting on a decision tree begins at the root decision tree node. Then, the following recursive process is performed on a decision tree node X:

1. if the decision tree node X is a leaf node, output the label encoded in X, output the uncertainty (if available) encoded in X, and output the unique identifier encoded in X (if requested). Stop. Prediction on the target decision tree node is complete.
2. if the decision tree node X is not a leaf node, apply the test given the parameterization encoded in X on the feature or features corresponding to the feature indices also encoded in X.

3. if the test passes, repeat step 1 where X is now the left node encoded in X (i.e. X:=X.left)
4. if the test fails, repeat step 1 where X is now the right node encoded in X (i.e. X:=X. right)

An ensemble of decision trees (EDT) is a group of decision trees, as noted above. The EDT is often represented as some collection of handles to root decision tree nodes. Predictions are made from an EDT by having each decision tree in the EDT "cast" a vote, and aggregating the votes. A classification EDT (CEDT) is an ensemble of classification trees, and similarly, a regression EDT (REDT) is an ensemble of regression trees. In this simplest case, predictions are made from a CEDT by taking the majority vote of the predictions made by the classification trees, and the weighted (by uncertainty) or unweighted mean is used to predict from an REDT. Many versions of EDTs are often referred to in relevant literature as a Random Forest.

The approach of the present invention identified above represents a significant advancement over existing implementations of machine intelligence that are either slow or use too much memory, or both. Speed is a significant concern when applying machine learning techniques to large data sets, since it affects the ability to quickly and efficiently capture the deeply embedded insight available from applying analytics to the large volumes of data available. There are several issues affecting speed in machine intelligence.

The primary causes of speed problems in machine intelligence include a lack of contiguity, which can be thought of as a lack of locality of reference. For example, suppose there are 1024 32-bit floats are needed for a computation. If they are located in the same 4096 byte page, then only a single page is needed. If each float instead resides in a different page, then 1024 pages are needed, with 4 bytes being used in each page, and the remaining 4092 bytes are wasted. A page fault results when a page in virtual memory does not reside in physical memory. A cache miss occurs when a block of memory needed for computation is outside the processor cache. Both page faults and cache misses can slow down the run time of a procedure. A lack of contiguity hinders a program's ability to make effective use of the processor cache and memory hierarchy, and can lead to page faults, cache misses, cache freezes, or cache thrashing. All of these incidents can slow down the run time of a procedure significantly.

Another of the primary causes affecting speed is function, or procedural call overhead. Most existing implementations of learning ensembles of decision trees are decomposed into sub-procedures, some of which are called recursively. The content of the processor (e.g., its registers) are often saved before a procedure call and restored when the sub-procedure returns control back to its caller. Still another of the primary causes affecting speed is repeated evaluation of if/then conditional statements on values that do not change during the execution of a procedure. The assumed value can be encoded as a type and passed as a template argument to a class or function. Partial template specialization can be used to exhibit specialized behavior for specific values. Some algorithms repeatedly compute an expression that evaluates to a Boolean repeatedly. By performing as much of this computation at compile time, program run time can be reduced. Dynamic dispatch is another issue affecting speed. Dynamic dispatch is a result of using inheritance and principles of dynamic polymorphism, and is a commonly-known way to abstract a sub-procedure's behavior in virtual methods of a subclass to execute the desired code. Many dynamic dispatch mechanisms (such as virtual functions in C++, abstract methods in Java, and virtual methods in Python) can incur substantial overhead. Additionally, the use of the same general algorithms (e.g. sorting, partitioning, statistics computation, set data structures) that are agnostic to the type of feature or shape of the data set, in terms of number of features or number of instances, may not exploit efficiencies, and this can have a significant impact on processing speed. The present invention may encode these assumptions in a type and use partial template specialization to exhibit specialized behavior that exploits efficiencies for each subtype.

As noted above, excessive memory usage is also a significant problem for existing decision tree implementations of machine intelligence. The primary causes for this high memory usage include unnecessary copying of data to generate subsets before learning a tree or inducing a split. Metadata is another cause of high memory usage, since some data structures incur substantial metadata overhead (e.g., a red-black tree or a linked list). Also, memory initialization requirements are problematic, since some implementations use significant memory resources for initialization. Some implementations do not quickly return memory used for initialization back to the operating system (e.g. via a system call).

The approach of the present invention and the various embodiments described herein addresses these root causes of speed and memory issues affecting machine intelligence. This is achieved in several mechanisms that when combined, result in performance improvements that enable significant applicability of the present invention in a single machine environment.

These mechanisms include application of one or more C++ concepts; each concept represents a set of function signatures, and typedefs that a class must have to "implement the concept". In the present invention, one such concept is a machine learning dataset (MLDataset) that is a representation of machine learning datasets in C++. Application of such a concept addresses all of the memory and speed bottlenecks outlined above and allows for instance subsetting, feature subsetting, multiple views of the same data set, problem-specific memory layouts, and wrappers for data structures passed from other programming languages (e.g. Java, Python, R, MATLAB, etc.).

Another concept addresses buffer contiguity by implementing solutions to address the problem of a lack of speed associated with avoidable cache misses, page faults, and fragmentation due to data elements needed for a computation are located in disparate virtual memory locations. One solution is a feature buffer cache, which copies dis-contiguous feature values (i.e. all instances with respect to a specific feature dimension) into a compact, contiguous buffer. The mechanism also includes an instance buffer cache which copies a dis-contiguous feature vector for an instance into a contiguous buffer. These solutions ensure that information to be gathered is located in the same buffer, thereby avoiding the delay of large numbers of clock cycles which significantly reduce processing speed.

Another of the concepts employed by the present invention includes encoding assumptions as types. In this aspect, rather than repeatedly evaluating a Boolean expression, the present invention evaluates a Boolean expression only when it could possibly change, and uses the outcome value of the Boolean expression to dispatch a specialization. Still another approach involves automatic assessment of data set assumptions. When a data set is loaded into memory from disk, some initial assumptions are deduced from it and encoded as types. At the compile time, some of these types can be used to dispatch specializations that potentially exploit efficiencies for those assumptions using template meta-programming.

Specialized sorting algorithms may also be employed in an ensemble of decision trees implementation in the present invention. Depending on the characteristics of the data, different variants of sorting algorithms can be used. In template meta-programming, the training process in learning ensembles of decision trees is parameterized with template arguments. Template-based pattern matching is often used to allow for more complex specialization of variants of the learning ensemble of decision trees algorithm.

Also, the approach of the present invention may dispatch instantiations of variants of decision tree learning and prediction. At program initialization, learning and prediction functions are instantiated according to different assumptions. These assumptions are encoded with types, and partial template specializations are instantiated by the compiler. Objects are created from these instantiations and stored in an associative array. These objects are keyed by a string of meta-data.

Other concepts which may be employed include inlining of variants to reduce function call overhead, as discussed in detail herein, and histogram approximation variants. The present invention contemplates use of inlining on procedures to reduce the function call overhead, especially procedures called a large number of times. Building a histogram to approximate a large feature column is another mechanism for achieving the objectives of the present invention. In this approach, the present invention approximates a feature with a specific feature index in a data set by using histograms rather than exact feature values.

The present invention therefore integrates, in one embodiment, multiple approaches to learning ensembles of design trees that when combined, take advantage of existing features of computer architecture and result in increased processing speed and efficient memory usage. One of these approaches, inlining, is a compiler optimization that replaces a function call site with the body of the callee that improves computation time at runtime. Inlining is invoked as a C++ concept and operates to copy the compiled code for a function into the caller's compiled code to avoid function call overhead (e.g. pushing register content and local variables to the stack for each function call). Use of this technique eliminates having to incur this function call overhead (potentially) billions of times. For each push to the stack from a register (or local variable) during each function call, all register data and local variable is popped off the stack to restore previous content, consuming several clock cycles (the exact number of cycles depends on the specific processor family, model, and subtype) for each push and pop. Inlining minimizes these pushes and pops to and from the stack to conserve the usage of clock cycles. This speeds up the process of calling a function, thereby reducing function call overhead.

Application of C++ concepts as described herein permits the present invention to determine what template specializations are needed at runtime, by inlining code as it required during compilation. This avoids a further problem associated with conditional if statements for which processing time must be devoted to perform each instance of. Employing C++ concepts to avoid conditional if statements is called template meta-programming.

Another approach seeks to implement an arrangement of properly aligned buffers to place bytes that are known to be necessary for compilation in a contiguous fashion, so that the present invention pulls significantly fewer pages of data from memory to blocks in the cache. When the necessary bytes are instead placed in disparate locations across the memory landscape in a computer's architecture, more cache misses result. Application of C++ concepts permits the implementation of contiguous buffers to overcome cache miss or cache freeze by preventing the modification of modification when it is not needed.

In one specific embodiment to this approach, the present invention takes advantage of areas in computer architecture where increases in speed may be found. For example, the present invention is able to make more efficient use of the cache by targeting aspects of computer architecture where there is such speed, such as by first operating in the smaller and faster L 1 cache in the hierarchy of caches, rather other areas such as the L2 or L3 caches. By doing so, for example, on some processors, computation on words in the cache can be 50× faster than an approach that involves pulling data from RAM to the cache for most repeated accesses and manipulations to the same data.

The third approach seeks to define and enforce type constraints on programming interfaces that access and manipulate machine learning data sets, in one or more specific C++ concepts that address specific kinds of datasets. A C++ concept is generally a mechanism for defining and enforcing constraints on types. Examples of these constraints include requiring specifically-named methods to be defined, sometimes with a specific return type and argument types, which is also known as a "method signature". Another constraint involves overloading of named methods (e.g., const and non-const methods on a class). Still another constraint requires specifically-named typedefs to be defined; these typedefs are useful so implementations of algorithms can make use.

Dataset C++ concepts as applied in the present invention seek to minimize inheritance by utilizing primarily a static, rather than dynamic, polymorphism approach. C++ concepts impose class templates and function templates to impart restrictions on the types that they take, so that any class can be supplied as a template parameter so long as it supports all of the operations that users of actual instantiations upon that type use. In the case of the function, the requirement an argument must meet is clear, but in the case of a template the interface an object must meet is implicit in the implementation of that template. Concepts therefore provide a mechanism for codifying the programming interface that a template parameter must meet.

The type constraints in a C++ concept are checked when a class that claims to adhere to the concept is needed by the C++ compiler at the time of compilation. The failure to satisfy any constraints will result in the failure of the program's compilation. The present invention therefore employs, in at least several embodiments, a specific C++ concept referred to further herein as an MLDataSet to define a mechanism to enforce constraints on programming interfaces that access and manipulate machine learning data sets.

The MLDataSet C++ concept represents either a labeled or unlabeled machine learning data set. As indicated above, this data set has m instances, which are (x, y) pairs where x is a vector of n data values (called features, observations, or collectively a feature vector) and y is the label for x. If x is unlabeled, it is undefined, and the label y is stored using a special sentinel value. Instances are indexed by an instance index, and features are indexed by a feature index. The j'th feature of the i'th instance represents the value $x_{ij}$. In the present invention, using a concept-based representation, as opposed to other methods (e.g., inheritance with dynamic dispatch), provides the key advantage in that the same algorithms can be used on different implementations of an MLDataSet, but without the dynamic dispatch overhead.

In the present invention, every class implementing the MLDataSet concept must define seven typedefs: label_type, which represents the type of the labels; feature_type, which represents the type of the features; single_feature_instance_iterator, which represents the type for a random access iterator over instances in the data set with a fixed feature index k; single_feature_instance_const_iterator, which is like single_feature_instance_iterator but obeys the const random access iterator concept; single_instance_feature_iterator, which represents the type for a random access iterator over instances in the data set with a fixed instance index k; single_instance_feature_const_iterator, which is like single_instance_feature_iterator, but obeys the const iterator concept; and a sparse_feature_pair, which is defined as a std::pair<size_t, feature_type>, which encodes a feature index and a feature value at that feature index for the purposes of enabling compatibility of sparse data files and providing for the manipulation of sparse data.

The MLDataSet must also provide functions for accessing size and problem type information: inline size_t get_num_instances( ) const, which returns the total number of instances or feature vectors in the data set; inline size_t get_num_features( ) const, which returns the total number of features in a feature vector; inline size_t get_num_classes( ) const, which returns the total number of classes (equal to 1 for regression); and inline LabelType get_labeling( ) const, which returns the machine learning problem type using enumerated types (classification or regression).

The MLDataSet concept must also provide functions for accessing individual feature values and labels: inline const label_type &get_label(size_t instance_index) const, which returns the label of a specific feature index; and inline const feature_type &operator( )(size_t instance_index, size_t feature_index) const. Another function, the get_num_classes( ) function returns the number of classes for classification and 1 for regression; it may be used for other purposes for other problem domains. The get_labeling( ) function returns either real, integer, or nominal.

The MLDataSet concept must also provide functions for generating iterators to feature values over a fixed feature index or a fixed instance index. The function inline single_feature_instance_const_iterator single_feature_instance_begin(size_t feature_index) const returns a const random access iterator that points to the feature value of the first instance index and inline single_feature_instance_const_iterator single_feature_instance_end(size_t feature_index) const returns a const iterator pointing to the feature value of one element past the last instance index and a fixed feature index.

The MLDataSet concept also must provide functions for generating iterators to feature values over a fixed instance index. The inline single_instance_feature_const_iterator single_instance_feature_begin(size_t instance_index) const returns a const random access iterator that points to the feature value of the first feature index and a fixed instance index. The inline single_instance_feature_const_iterator single_instance_feature_end(size_t instance_index) const returns a const iterator pointing to the feature value of one element past the last feature index and a fixed instance index.

Figure 1B:
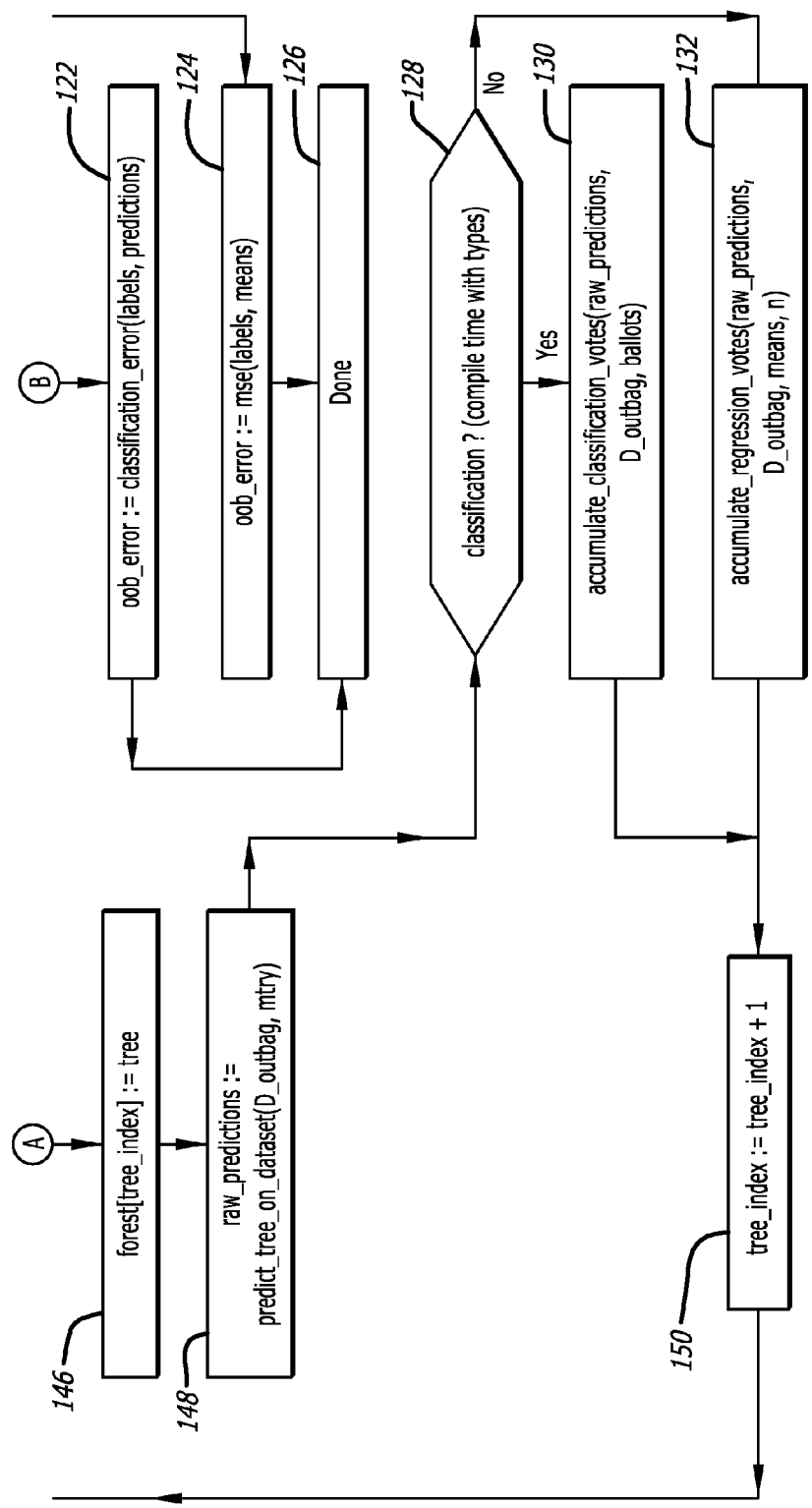
Figure 2A:
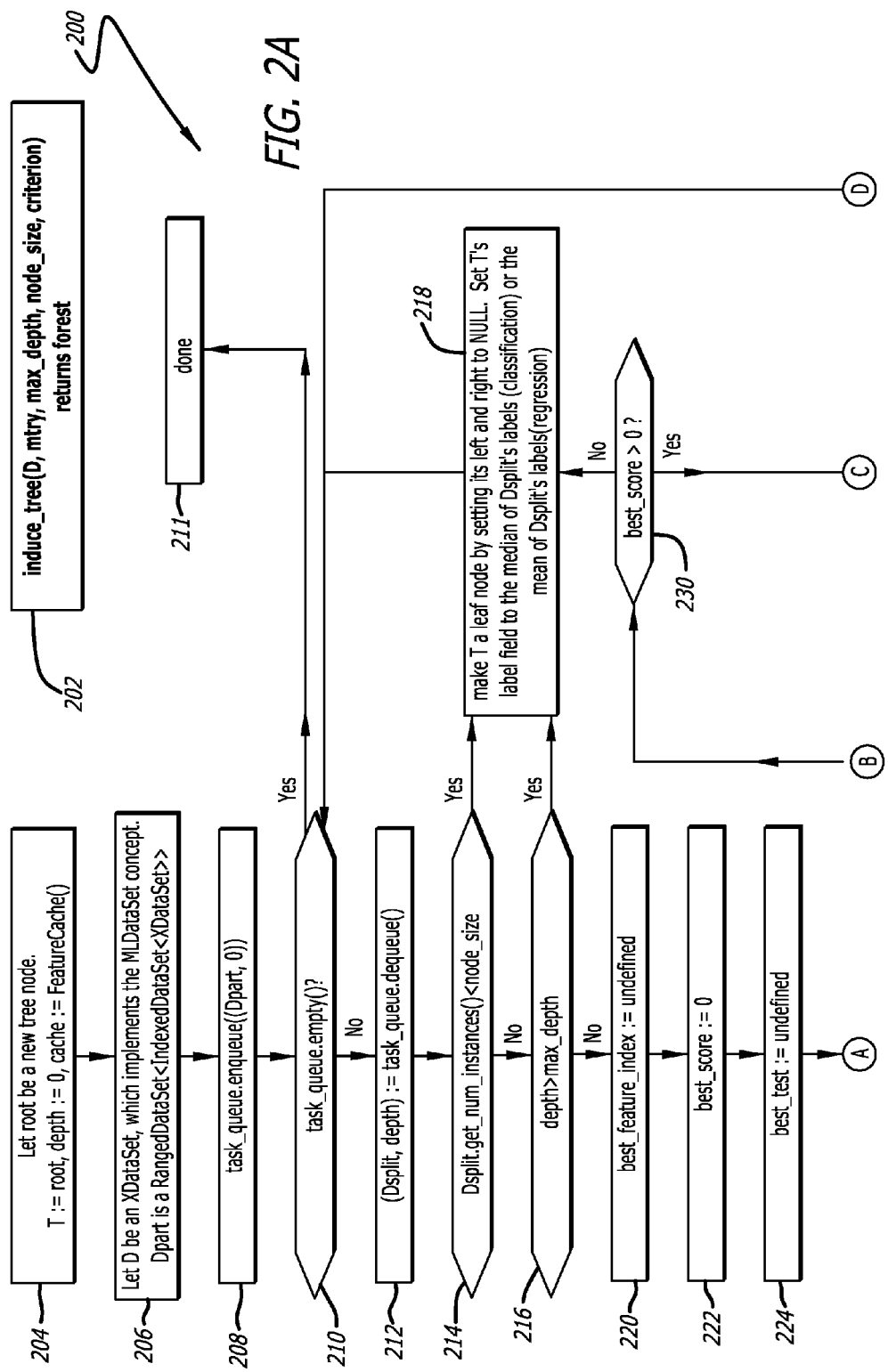
FIG. 2 is a flow diagram representing steps in inducing a tree in the process of learning a decision forest for homogeneous datasets according to one embodiment of the present invention.
Figure 2B:
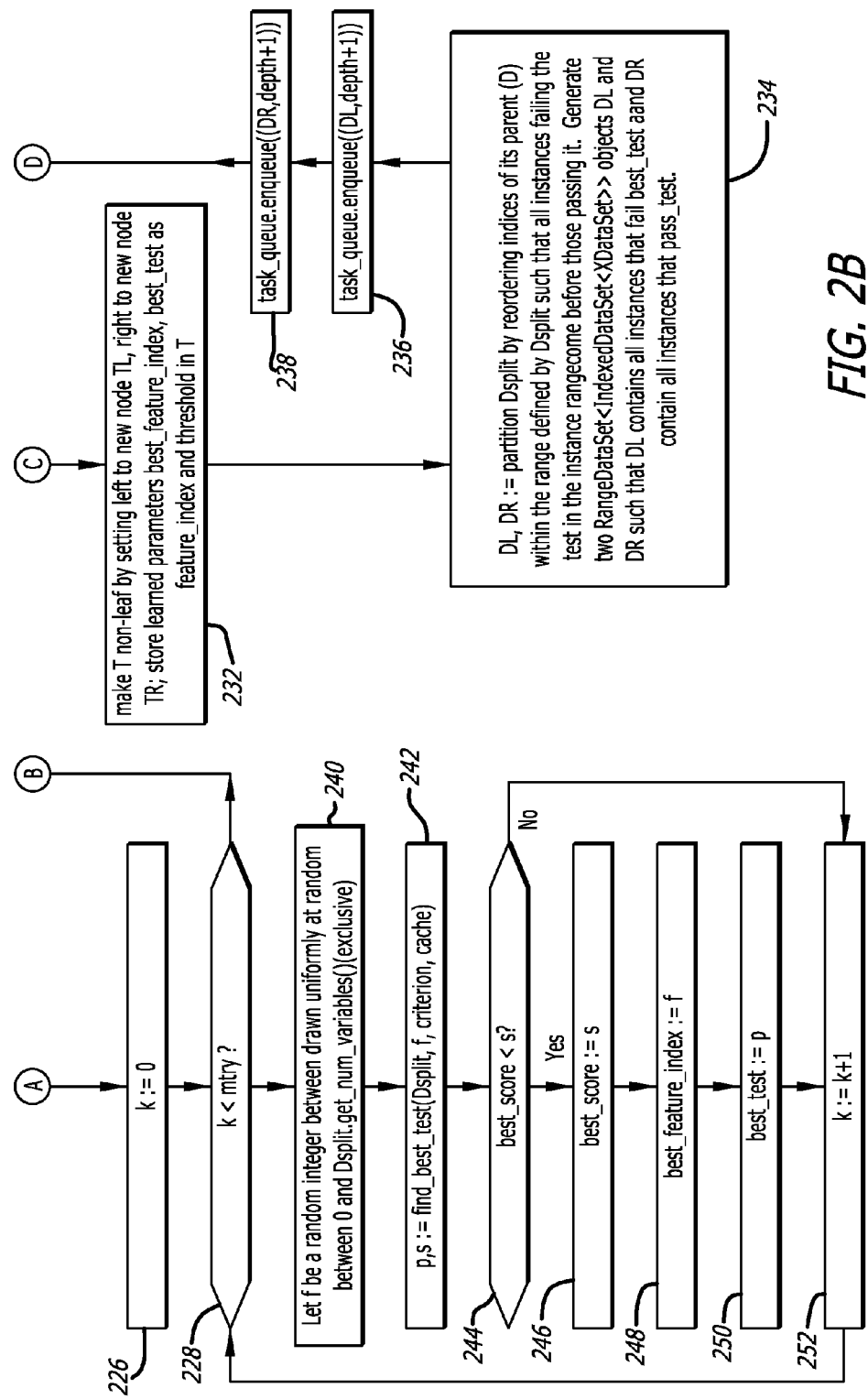
Figure 3A:
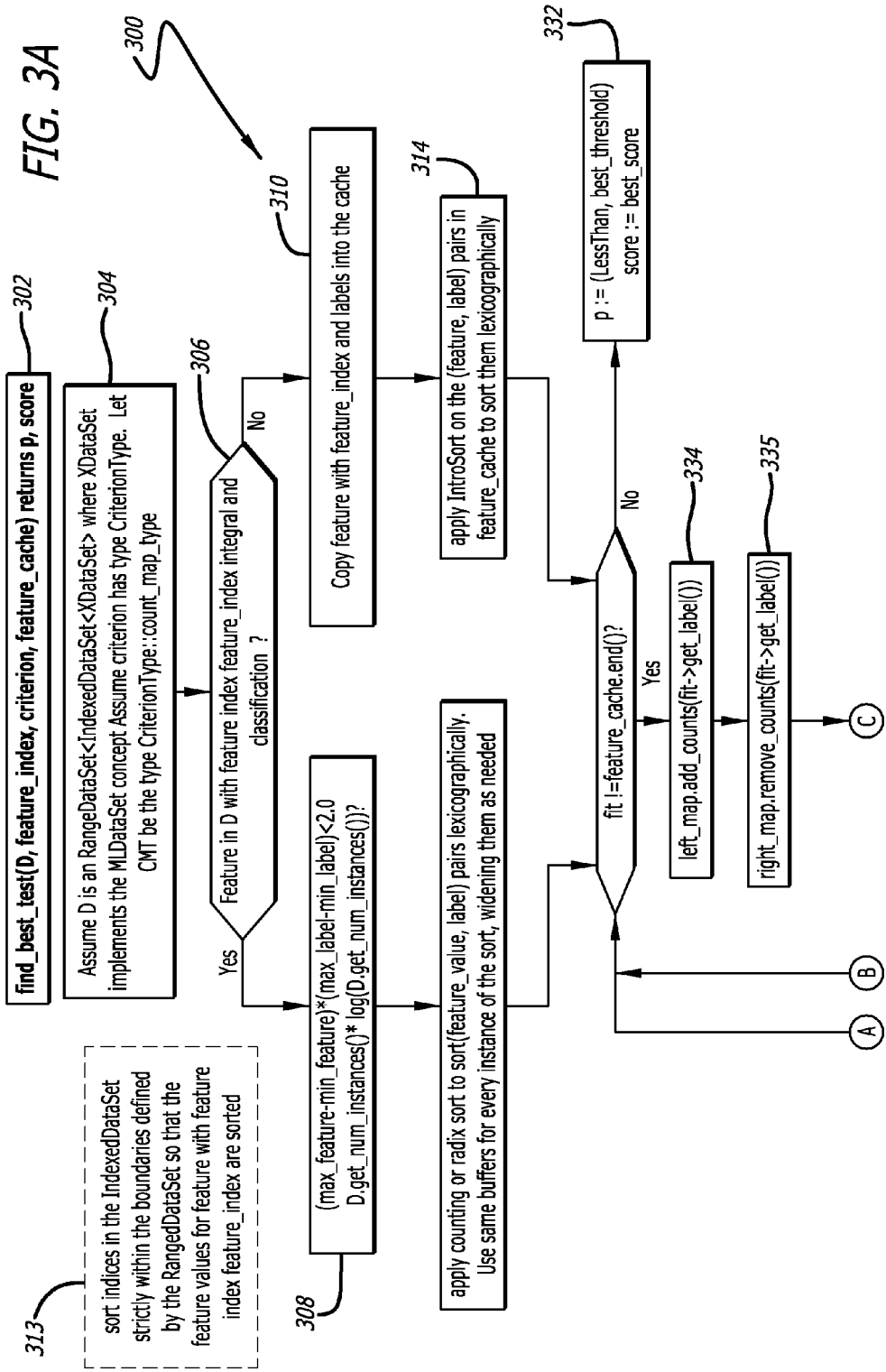
FIG. 3 is a flow diagram representing steps in inducing a node in the process of learning a decision forest for homogeneous datasets according to one embodiment of the present invention.
Figure 3B:
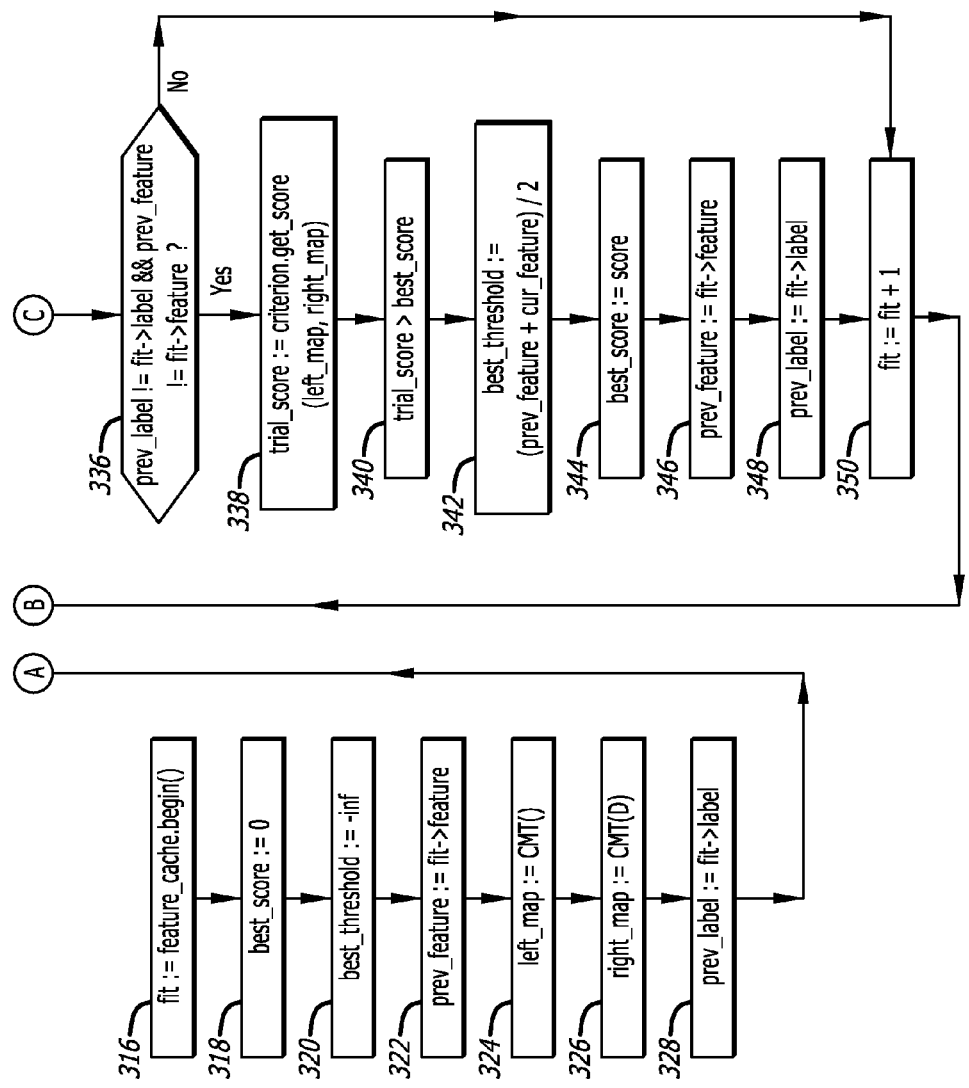

FIG. 1, FIG. 2 and FIG. 3 are exemplary flow diagrams representing procedures for inducing a forest, a tree, and a node, respectively, for instantiating a class implementing a MLDataSet concept in the process of learning a decision forest for homogeneous datasets. Referring to FIG. 1, inducing a forest for instantiating a class implementing a MLDataSet concept for homogeneous datasets begins by calling an induce_forest routine 100. In step 102 a plurality of input variables are specified for the routine 100, such as D, mtry, max_depth, node_size, criterion, bootstrapped, and sampling proportion. Box 102 also provides that the routine will return the induced forest and the oob_error value, which is the error of the decision forest when each tree is applied exclusively to the instances that were not present in the subsample used to induce the tree.

In step 104, it is noted that D is an input object of a class XDataSet for implementing the MLDataSet concept. In step 106, predictions are defined as an array of size D.get_num_instances( ) and in step 108, labels are defined as an array of type typeof(D)::label_type with values obtained by iterating over labels.

The routine 100 progresses by initial determining whether to compile for a classification with types in step 110. If yes, the routine 100 proceeds with step 112 and defines ballots as an array of size D.get_num_instances( ) where each element is an array of size max_label+1 of integers initialized to 0. The routine 100 then proceeds with step 134, and also to step 116 by defining n as an array of size D.get_num_instances( ). If the routine 100 initially determines not to compile for a classification with types in step 110, the routine 100 skips ahead to step 114, where a variable means is defined as an array of size D.get_num_instances( ) and from there to step 116 where a variable n is defined as an array of size D.get_num_instances( ) as above. Following step 116, the routine 100 proceeds to step 134.

The routine 100 performs Step 118 is performed once the condition in step 138 fails. At this point again determines whether to compile for a classification with types in step 118. If not, the routine skips to step 124 and returns an oob.error (out-of-bag mean squared error) value defined as the value returned by mse(labels, means), and the routine 100 terminates at step 126. If at step 118 a compile time type is determined to be for classification, then the routine 100 defines predictions by the value convert_classification_ballots_to_labels(ballots) at box 120, which returns a label with the highest vote for each ballot. An oob_error value is then defined as the value returned by calling classification_error (labels, predictions), which returns the classification error given the labels and predictions at step 122, and the routine 100 terminates at step 126.

As noted above, the routine 100 performs steps 128-150 after defining ballots as an array of size D.get_num_instances( ) where each element is an array of size max_label+1 of integers initialized to 0 in step 112. In box 134 the tree_index variable is set to 0, and in step 136 a forest is defined as an array of NULLs of a size defined by the number of trees. The tree_index must be less than the number of trees in step 138, else the routine 100 proceeds to step 118 as above. If the tree_index value is less than the number of trees in step 138, then the routine 100 proceeds with creating a variable D_inbag as in step 140. The D_inbag variable is created with type IndexedDataSet<XDataSet> and is a realization of a subsample drawn with (or without optionally without) replacement of instances of the value D according to the sampling proportion specified as input to routine 100.

The routine 100 proceeds in step 142 with making the variable D_outbag to be of the type IndexedDataSet<XDataSet> and to contain those instances of D not in D_inbag, ie those instances not in the subsample used to induce the tree. In step 144, a tree is by the value learn_tree(D_inbag, mtry, max_depth, node_size, criterion), and in step 146 a tree is further equated to a forest[tree_index]. In step 148, raw_predictions are equated by the value predict_tree_on_dataset(D_outbag, mtry), and in step 128, the routine 100 again determines whether to compile with types for a classification. If yes, then in step 130 the routine 100 calls accumulate_classification_votes(raw_predictions, D_outbag, ballots), which casts a vote for each instance in D_outbag in the ballot with the same index as the parent instance index in the array of ballots. The routine 100 then sets tree_index to be tree_index+1 in step 150 and returns to step 138. If in step 128 is not a classification at compile-time, then the routine 100 calls accumulate_regression_votes(raw_predictions, D_outbag, means, n), which updates the means for a regression in step 132, and proceeds to step 150.

FIG. 2 is an exemplary diagram for a procedure for inducing a tree for instantiating a class implementing a MLDataSet concept in the process of learning a decision forest for homogeneous datasets. In step 202 a plurality of variables are specified for a routine 200, such as D, mtry, max_depth, node_size, and criterion. The routine 200 is also provided with a return root instruction. In step 204, a root is defined as a new tree node, a pointer T is made to this variable root, a depth is equated to zero, and a cache is defined as FeatureCache( ). In step 206, D is defined as an XDataSet, which implements the MLDataSet concept (or DataSet concept for short). Dpart is defined as a RangedDataSet<IndexedDataSet<MLDataSet>>.

In step 208, task_queue.enqueue((Dpart, 0)) is specified, and in step 210, the routine 200 determines if the queue is empty by calling task.queue.empty( ). If yes, then the routine 200 is terminated at step 211. If no, the routine 200 proceeds to step 212 and equates (Dsplit, depth) with task_queue.dequeue( ). Dsplit represents the partition of the subsample Dpart used to induce a decision tree node. At box 214, the routine 200 checks Dsplit.get_num_instances( )<node_size, and if so, continues to step 218, and if not, continues to step 216. In box 216, routine 200 then determines whether a depth is greater than the value for max_depth, and if true, continues to step 218. In step 218 the value for T is made a leaf node by setting its left and right to NULL. T's label field is also set to the median of Dsplit's labels for classification, and to the mean of Dsplits's labels for regression. Following step 218, routine 200 proceeds to step 210.

If the depth is not greater than the max_depth value in box 216, then best_feature_index is undefined in box 220, best_score is equated to zero in step 222, best_test is undefined as in step 224, and k is equated to zero in step 226. In step 228, the routine 200 looks to whether k is less than mtry, and if it is, then the routine 200 lets f be a random integer selected, or drawn, uniformly at random between 0 and Dsplit.get_num_variables( ) (exclusive) in step 240. This integer is used to represent the index of the next feature to try inducing a split on Dpart.

The routine 200 proceeds by defining p, s as find_best_test(Dsplit, f, criterion, cache) in step 242. In step 244, the routine 200 asks whether best_score is less than the value s, and if it is, then best_score is equated to the value s in step 246, best_feature_index is equated to a value f in step 248, best_test is equated to a value p in step 250, and k is equated to k+1 in step 252. The routine 200 then loops to step 228 to determine whether k is less than the value for mtry. If best_score is not less than s, the routine 200 proceeds directly to step 252.

If k is not less than mtry, then routine 200 proceeds to step 230 and determines whether best_score is greater than 0. If not, then the routine 200 invokes step 218 as noted above, and proceeds to step 210.

If best_score is greater than zero, the routine 200 makes T non-leaf by setting left to new node TL, and right to new node TR in step 232. The routine also stores learned parameters best_feature_index, best_test as feature_index and threshold in T. The routine 200 then defines DL, DR by partitioning Dsplit in step 234, by reordering indices of its parent D within the range defined by Dsplit such that all instances failing the test in the instance range come before those passing it. The routine 200 in this step then generates two RangedDataSet<IndexedDataSets> objects DL and DR, so that DL contains all instances that fail best_test and DR contains all instances that pass best_test.

The routine 200 then proceeds in step 236 by calling enqueue (DL, depth+1) to enqueue onto the task queue (DL, depth+1) so that a node can later be induced on those instances in Dsplit failing the test, represented by DL. Then, routine 200 then proceeds to step 248, where the same is done for the instances in Dsplit passing the test (represented by DR) by calling task_queue.enqueue((DR, depth+1)). The routine 200 then returns to step 210.

FIG. 3 is an exemplary diagram for a procedure for inducing a tree for instantiating a class implementing a MLDataSet concept in the process of learning a decision forest for homogeneous datasets. In step 302 a plurality of variables are specified for a routine 300, such as D (an object of a class implementing the MLDataSet concept), feature_index (represents the index of the feature to learn the best test/threshold), criterion (the objective function to optimize) and feature_cache (a contiguous buffer to store (feature, label) pairs). Additionally, the routine 300 is specified to return values for p and score.

In step 304, the routine 300 assumes a value for D to be a RangedDataSet<IndexedDataSet<XDataSet>> where XDataSet implements the MLDataSet concept (or DataSet concept for short). The routine 300 further assumes that criterion in step 302 have the type CriterionType, where CMT is the type CriterionType::count_map_type.

In step 306, the routine 300 determines whether a feature in D has integral features and the labels are for classification. If not, then in step 310 the routine 300 copies a feature with feature_index and labels into the cache, and in step 314 applies IntroSort on the (feature, label) pairs in feature_cache to sort then lexicographically.

If a feature in D has a feature index of feature_index integral and classification in step 306, the routine 300 proceeds to step 308 where it determines whether (max_feature-min_feature)*(max_label-min_label) is less than 2.0 D.get_num_instances( )*log(D.get_num_instances( ). If so, then in step 312 the routine 300 applies a counting or radix sort to sort (feature_value, label) pairs lexicographically. The routine 300 uses the same buffers for every instance of the sort, widening them as needed.

The routine 300 sorts indices in the IndexedDataSet strictly within boundaries defined by the RangedDataSet<IndexedDataSet<XDataSet>> D so that the feature values for feature with feature index feature_index are sorted, as noted in box 313. The routine returns p and score values by first defining fit to be the value of feature_cache.begin( ) in step 316. In step 318, best_score is set to 0, and in step 320 best_threshold is set to −inf. The value for prev_feature is defined as fit->feature in step 322, and in box 324 and box 326 respectively, left_map and right_map are equated to new CMT objects where the right_map is initialized so that the statistics it maintains are initialized so that all instances are initially assumed to pass the test that is being learned. In box 328, prev_label is defined as fit->label.

The routine 300 then proceeds to determine, in box 330, whether fit is not equal to feature_cache.end( ). If yes, then in box 332, p is set as (LessThan, best_threshold), and score is defined as best_score.

If not, then the routine 300 proceeds by calling left_map.add_counts(fit->get_label( ) in box 334, which updates some variables in left_map needed by criterion.get_score( ) so that it can compute a score assuming the instance pointed to by fit now fails the test, and then calls right_map.remove_counts(fit>get>label( ) in box 335, which updates variables in right_map needed by criterion.get_score( ) so the instance pointed to by fit is no longer is considered to pass the test. Next, the routine 300 determines whether prev_label is not equated to fit->label and whether prev_feature is not equated to fit->feature in step 336. If no, the routine 300 proceeds to step 350 as noted below. If yes, then in box 338, trial_score is defined as criterion.get_score(count_map, left_map, right_ map), and step 340, trial_score is set to be greater than best_score. In the next step, in box 342, best_threshold is defined as (prev_feature+cur_feature)/2 and best_score is equated to score in box 344. A value for prev_feature is fit->feature in box 346, and prev_label is fit->label in box 348, and the iterator fit points to the next instance in the feature_cache by setting it to fit+1 in box 350. The routine 300 then returns a loop to step 330 to proceed with returning p and score values in step 332, or continuing with steps 334-350.

Another dataset C++ concept in the present invention is a WritableMLDataSet concept, which extends the MLDataSet concept and allows the labels and feature values to be changed, and new instances to be added. In this concept, inline void set_feature_value(size_t instance_index, size_t feature_index, const feature_type &val) sets a specific feature value (indexed by feature_index) of an instance's feature vector (indexed by instance_index). Also, the inline void set_label(size_t instance_index, const label_type &label) sets the label of the instance indexed by the instance_index passed to the label passes. Also, template <class FeatureIterator> inline void add_instance_with_dense_feature_vector(label_type label, FeatureIterator fbegin, FeatureIterator fend) adds an instance to the data set. The label of the new instance is passed as the first argument. Begin and end iterators to a dense representation of the feature vector of the new instance are also passed. Further, template <class FeatureIterator> inline void add_instance_with_sparse_feature_vector(label_type label, FeatureIterator fbegin, FeatureIterator fend) adds an instance to the data set with label "label" and features starting from iterator fbegin and ending at iterator fend (the iterators must point to an object of type or reference to an object of type sparse_feature_index_feature_value. All existing iterators to elements in the DataSet are invalidated when an instance is added, an instance is removed, or the ordering of instances is changed in any way.

The single_instance_feature_iterator single_instance_feature_begin(size_t instance_index) is like the function of the same name described in preceding paragraphs but instead returns a non-const random access iterator. The single_instance_feature_iterator single_instance_feature_end(size_t instance_index) is like the single_instance_feature_end function just described but returns a non-const random access iterator.

The function inline single_feature_instance_iterator single_feature_instance_begin(size_t feature_index) is like the function of the same name described earlier but instead returns a non-const random access iterator. The inline single_feature_instance_iterator single_feature_instance_end(size_t feature_index) is like the function of the same name described earlier but instead returns a non-const iterator.

WritableMLDataSet is a separate concept, rather than its constraints and interfaces being included in the MLDataSet concept. This permits separate interfaces that perform read-only manipulations to a data set (MLDataSet) with interfaces that can change feature values, labels, and add instances to a data set (WritableMLDataSet). A read-only contract for MLDataSet ensures that it is safe to let multiple threads use the same copy of the underlying data set (even though the view data sets may be different).

In the MLDataSet concept, a class that implements facilities for caching features implements the FeatureCache concept as follows:
  inline void cache_feature(size_t feature_index)—this caches (feature, label) values for a specific feature index over all instances in a contiguous buffer.
  inline void cache_feature(size_t feature_index, size_t begin_instance_index, size_t end_instance_index)—this caches (feature, label) values for a specific feature index over a range of instances defined by a beginning instance index and ending instance index.
  typedef FeatureCacheIterator—this is a type for a non-const iterator over (feature, label) pairs in the feature cache.
  typedef FeatureCacheConstIterator—this is a type for a const iterator over (feature, label) pairs in the feature cache.
typedef FeatureCachePair—this is a type std::pair<label_type, feature_type> that represents the underlying value to which objects of the FeatureCacheIterator and FeatureCacheConstIterator classes point.

Figure 11:
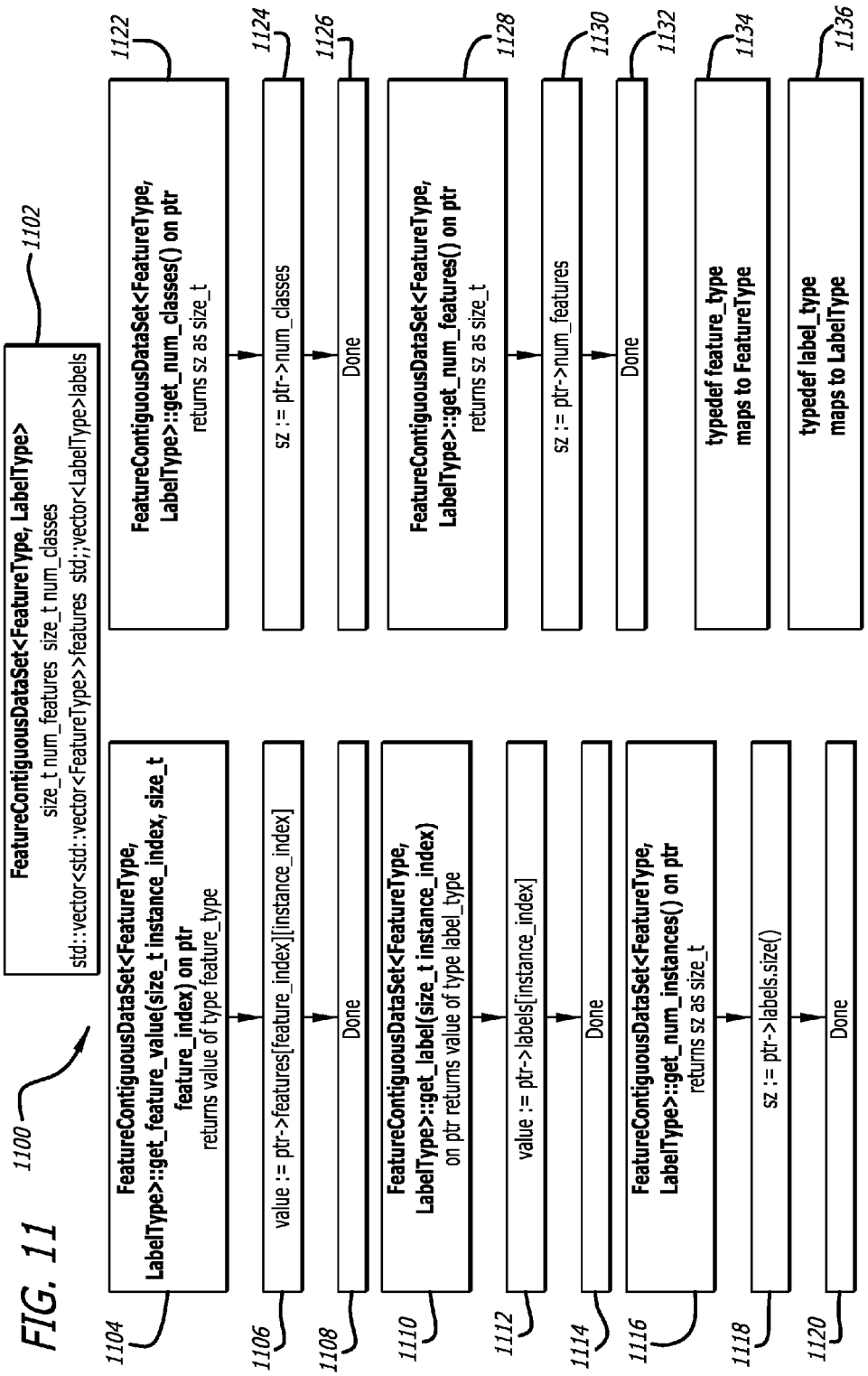
FIG. 11 is a conceptual flow diagram illustrating a class implementation for training of data within a MLDataSet concept according to the present invention.

FIG. 11 is a conceptual flow diagram of FeatureContiguousDataSet's implementation 1100 of the MLDataSet concept, which is specified in box 1102 as FeatureContiguousDataSet<FeatureType, LabelType>. This implementation 1100 improves the computational efficiency of learning EDTs on data sets in the present invention by laying out instances within a single feature column in a contiguous fashion. Box 1102 illustrates that FeatureContiguousDataSet has two template arguments, FeatureType and LabelType and has a plurality of member variables num_features (of type size_t), num_classes (of type size_t), features (an array of arrays of type feature type), and labels. Boxes 1134 and 1136 define two typedefs for the class FeatureContiguousDataSet, feature_type is mapped to type FeatureType and label_type is mapped to type LabelType. Procedure 1104 illustrates a non-static class method that retrieves individual feature values given an instance index (instance_index) and a feature index (feature_index), and returns the feature value in a variable value of type feature_type. In Step 1106 of Procedure 1104, it assigns value to ptr->features[feature_index][instance_index], and terminates in step 1108. Procedure 1110 retrieves an individual label, returning a value of type label_type. Step 1112 of Procedure 1110 retrieves the label pointed to by instance_index and stores it in the variable value, and then terminates in step 1114. Procedure 1116 returns the number of instances in the object pointed to by ptr. Step 1118 in Procedure 1116 sets sz to the size of the label array in the object pointed to ptr by calling ptr->labels.size( ), and then terminates in step 1120. Procedure 1122 retrieves the number of classes in the object pointed to by ptr and returns the variable sz. Step 1124 in Procedure 1122 sets sz to ptr->num_classes and terminates in step 1126. Procedure 1128 returns a variable sz. It sets the sz variable to ptr->num_features, or the number of features in the data set pointed to by ptr.

Also,
    inline FeatureCacheIterator begin( )
    inline FeatureCacheIterator end( )
    inline FeatureCacheConstIterator begin( ) const
    inline FeatureCacheConstIterator end( ) const
return a const or non-const iterator to a pair to the first feature in the feature cache, or a const or non-const iterator to one past the last feature in the feature cache.

Additionally, a class that implements facilities for caching an instance's feature vector is said to implement the InstanceCache concept:
    inline void cache_instance(size_t instance_index)—caches an instance of a particular instance index into a contiguous buffer.
    typedef InstanceCacheIterator—a type for a non-const iterator over an instance's feature vector.
    typedef InstanceCacheConstIterator—a type for a const iterator over an instance's feature vector.

Figure 12:
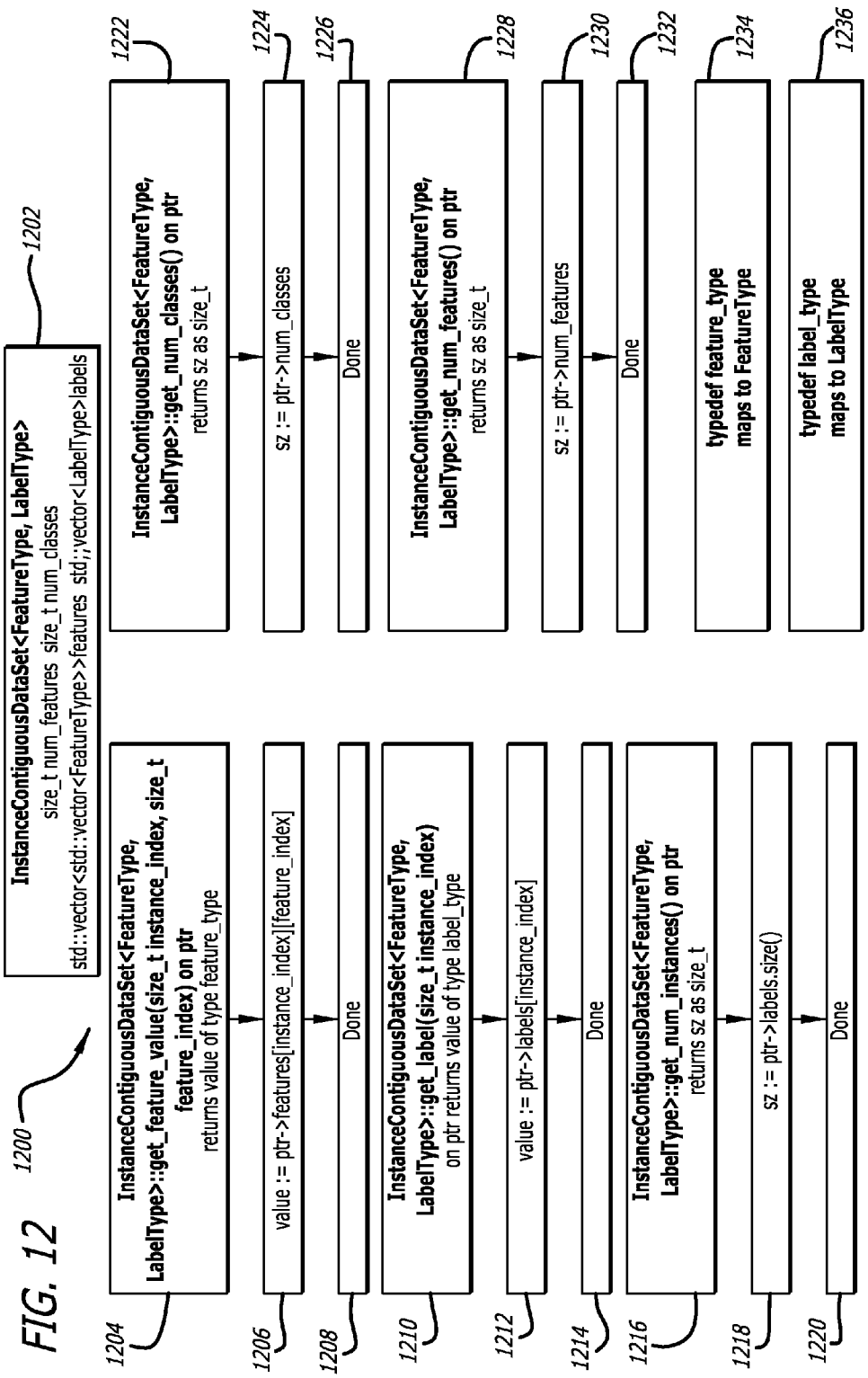
FIG. 12 is a conceptual flow diagram illustrating a class implementation for caching an instance's feature for prediction of data within a MLDataSet concept according to the present invention.

FIG. 12 is a conceptual flow diagram of InstanceContiguousDataSet's implementation 1200 of the MLDataSet concept, which is specified in box 1202 as InstanceContiguousDataSet<FeatureType, Label Type>. This implementation 1200 improves the computational efficiency of using learned EDTs for the purpose of prediction on data sets in the present invention by laying out each feature vector within a single instance in a contiguous fashion. Box 1202 illustrates that InstanceContiguousDataSet has two template arguments, FeatureType and LabelType and has a plurality of member variables num_features (of type size_t), num_classes (of type size_t), features (an array of type array of type feature type), and labels (an array of type label_type). Boxes 1234 and 1236 define two typedefs for the class InstanceContiguousDataSet, feature_type is mapped to type FeatureType and label_type is mapped to type LabelType. Procedure 1204 illustrates a non-static class method that retrieves individual feature values given an instance index (instance_index) and a feature index (feature_index), and returns the feature value in a variable value of type feature_type. In Step 1206 of procedure 1204, it assigns value to ptr->features[instance_index][feature_index] where ptr->features[instance_index] yields a reference to the array that represents the feature vector for instance index, and ptr->features[instance_index][feature_index] represents the feature with index feature_index in that feature vector. Following this, procedure 1204 terminates in step 1208. Procedure 1210 retrieves an individual label, returning a value of type label_type. Step 1212 of procedure 1210 retrieves the label pointed to by instance_index and stores it in the variable value (value:=ptr->labels[instance_index]), and then terminates in step 1214. Procedure 1216 returns the number of instances in the object pointed to by ptr. Step 1218 in procedure 1216 sets sz to the size of the label array in the object pointed to (sz:=ptr->labels.size( ), and then terminates in step 1220. Procedure 1222 retrieves the number of classes in the object pointed to by ptr and returns the variable sz. Step 1224 in procedure 1222 sets sz to ptr->num_classes and terminates in step 1226. Procedure 1228 returns a variable sz representing the number of features in the data set. Step 1230 sets the sz variable to ptr->num_features, and terminates in Step 1232.

The class is defined by size_t num_features, size_t num_classes, std:vector<std::vector<FeatureType>>features, and std:vector<LabelType>labels.

Also,
    inline InstanceCacheIterator instance_cache_begin( )
    inline InstanceCacheIterator instance_cache_end( )
    inline InstanceCacheConstIterator instance_cache_begin( ) const
    inline InstanceCacheConstIterator instance_cache_end( ) const
returns const and non-const iterators to the first feature of the instance cache (first feature in the feature vector) and one past the last feature in the instance cache (one past the last feature in the feature cache).

The MLDataSet concept is implemented in several classes in which machine learning data is stored in memory. Each uses a memory layout that is optimized for a different workload or purpose. One such class—In Memory Feature-Contiguous Data Set—stores a machine learning data set so that all instances for a specific feature index are stored contiguously. This layout is useful for learning trees because each feature is considered independently during tree induction. Another class, In-Memory Instance-Contiguous Data Set, stores a machine learning data set so that all features for a specific instance index are stored contiguously. This layout is useful for evaluating a tree on a single instance.

Another class, In Memory Sparse Feature-Contiguous Data Set, stores a machine learning data set in a sparse representation so that the sparse array is first indexed by feature index in an associative array (potentially non-sparse), and then as a list of (instance_index, feature_value) pairs. Thus, feature values for a specific feature index are contiguously arranged in memory. Still further, another class, In Memory Sparse Instance-Contiguous Data Set, stores a machine learning data set in a sparse representation so that the sparse array is first indexed by instance index in an associative array (potentially non-sparse), and then as a list of (feature_index, feature_value) pairs. Thus, feature values for a specific feature index are contiguously arranged in memory.

As noted above, at least one aspect of the present invention operates by de-correlating decision trees by looking at different subsets of data. The following classes implement the MLDataSet concept and represent subsets of either features or instances by referring to a parent data set. These subsets may be compounded (for example, a ranged subset of an indexed subset of a data set). One such class, Instance-indexed Subset Data Set, controls the view to another data set (called the parent data set) that implements the MLDataSet concept, so that it represents a subset of instances by storing an array of instance indices. This array may contain duplicate instance index values. This class implements a feature-contiguous cache so that feature values for a specific feature index can be cached. This is especially useful when many instances over a single feature index are needed repeatedly, such as when learning a node in a decision tree. It also implements an instance-contiguous cache so that the feature vector for a specific instance index can be cached. This is useful for prediction when all or some of the features for a specific instance are needed to traverse a decision tree or an ensemble of decision trees for the purpose of prediction, computing out-of-bag error, or some measure of feature importance.

In another view, an Instance-indexed Ranged Subset Data Set is a class that controls the view to another data set (called the parent data set) that implements the MLDataSet concept so that it represents a subset of instances by storing a minimum and maximum instance index to its parent. The minimum instance index and maximum instance index are equal if and only if the subset represented is the null set. This class implements a feature-contiguous cache so that feature values for a specific feature index can be cached, or refer to a range over its parent's feature-contiguous cache if it is available. It also implements an instance-contiguous cache so that the feature vector for a specific instance index can be cached, or refer to a range over its parent's instance cache if it is available.

A Feature-indexed Subset Data Set is similar to the Instance-indexed Subset Data Set, but represents a subset of features by storing an array of feature indices instead of an array of instance indices. The cache requirements are the same as the Instance-indexed Ranged Subset Data Set. A Feature-indexed Ranged Subset Data Set is similar to the Instance-indexed Ranged Subset Data Set, but represents a subset of features by storing the minimum feature index and maximum feature index instead of minimum instance index and maximum instance index. The cache requirements are the same as the Instance-indexed Ranged Subset Data Set.

A view implementation of an MLDataSet may also implement a InstanceIndexReconstructable concept so that the instance index in the parent corresponding to an instance index in the view can be reconstructed by calling the function inline size_t get_parent_index(size_t instance_index) const.

Other classes implement the MLDataSet concept so that machine learning data sets represented as data structures from other languages can be passed to the present invention and used accordingly. These include C-Contiguous NumPy Array Data Set, Discontiguous NumPy Array Data Set, Python Sequence Protocol Data Set, Python SciPy Sparse Data Sets (a separate implementation exists for each of the CSC, CSR, BSR, LIL, DOK, COO, and DIA formats supported in SciPy), Python Buffer Protocol Data Set, Java C-Contiguous Primitive Array Data Set, Java Discontiguous Strided Primitive Array, Ruby Primitive Array Data Set, R C-Contiguous Primitive Array Data Set, R Discontiguous Strided Primitive Array Data Set, and Matlab Array Data Set.

The MLDataSet concept may be configured to allow for one implementation of a concept to be a view on another class that implements that same concept. In the following example, a CSV file is loaded into an in-memory, feature-contiguous object of a class that implements the MLDataSet concept. The features are of type float and the labels are of type int. An indexed data set is then created over the in-memory data set, and instances are selected with replacement uniformly at random:

```
typedef FeatureContiguousMemoryDataSet <float, int>
    mem_dataset;
FeatureContiguousMemoryDataSet dataset;
Dataset.load_from_csv("file.csv");
IndexDataSet<mem_dataset> indexed_dataset(dataset);
const size_t n(dataset.get_num_instances( ));
indexed_dataset.sample_indices_iid_uniformly_at_ran-
    dom(n);
```

FIG. 13 is a conceptual flow diagram illustrating this class's implementation 1300 for indexing within the MLDataSet concept, which is specified in box 1302 as IndexedDataSet<ParentDataSet>. This implementation 1300 enables memory-efficient subsampling, and computation reductions using the inlining steps of FIG. 13. Box 1302 illustrates that IndexedDataSet has a single template argument ParentDataSet where ParentDataSet is some other class implementing the MLDataSet concept, and two member variables: parent, which is a pointer to a ParentDataSet object containing the instances of the subsample that IndexedDataSet<ParentDataSet> represents and indices, which is an array instance indices that point to instances in parent. IndexedDataSet<ParentDataSet> has two typedefs, feature_type is mapped to the type ParentDataSet::feature_type, and label_type is mapped to the type ParentDataSet::label_type as illustrated in boxes 1334 and 1336.

Procedure 1304 illustrates a non-static class method that retrieves individual feature values given an instance index (instance_index) and a feature index (feature_index), and returns the feature value in a variable value of type feature_type. In Step 1306, the feature value corresponding to instance with instance index ptr->indices[instance_index] and feature index feature_index is assigned to val. It assigns value to ptr->parent->get_feature_value(ptr->indices[instance_index], feature_index). Following this, Procedure 1304 terminates in step 1308. Procedure 1310 retrieves an individual label, returning a value of type label_type. Step 1312 of procedure 1310 retrieves the label in the parent indexed by instance_index from the parent and by setting value to ptr->parent->get_label(ptr->indices[instance_index]), and then terminates in step 1314. Procedure 1316 returns the number of instances in the object pointed to by ptr, which is effectively the size of the subsample represented by the object ptr on ptr->parent. Step 1318 in procedure 1316 sets sz to the value returned by ptr->indices.size( ) and then terminates in step 1320. Procedure 1322 returns the number of classes in the variable sz. Step 1324 in procedure 1322 sets sz to ptr->parent->get_num_classes( ) and terminates in step 1326. Procedure 1328 returns a variable sz representing the number of features in the data set. Step 1330 in procedure 1328 sets the sz variable to ptr->parent->get_num_features( ) and terminates in step 1332.

With the IndexDataSet, a subset is formed over any data set with only the overhead to store the instance indices themselves, which is negligible for high-dimensional data. A RangeDataSet is then composed over an IndexDataSet to select only a contiguous range of it. The RangeDataSet has O(1) memory complexity. For example, the first 5 instances only may be selected from the parent data set:

```
RangeDataSet<IndexDataSet<mem_dataset>>range_
    dataset(indexed_dataset, 0, 5);
```

The composition of RangeDataSet<IndexDataSet<FeatureContiguousMemoryDataSet>> is useful when learning each decision tree in an EDT because before an algorithm proceeds to build subtrees of a decision tree node, it partitions (using a Test) the instances so that the left tree is trained with one partition, and the right tree is trained with the other partition.

A PartitionIndexDataSet also has O(1) memory overhead, and it can be used to represent partitions of a parent data set and their complements. For example, to create the 3rd partition of a data set partitioned into ten partitions:

```
indexed_dataset.select_all_from_parent( )
indexed_dataset.random_shuffle(mg);
PartitionDataSet<IndexDataSet<mem_dataset>>third_
    partition(indexed_dataset, 3, 10);
```

Similarly, a view may be created that gives us the complement of the third partition where the universe of discourse is the parent data set (i.e. indexed_dataset):

```
PartitionDataSet<IndexDataSet<mem_dataset>,
    Complement>third_partition_prime(indexed_dataset,
    3, 10);
```

An example where the above would be useful is performing cross-validation in a manner that avoids copying the data when applying a training procedure to each fold.

FIG. 14 is a conceptual flow diagram illustrating this class's implementation 1400 for partitioning within the MLDataSet concept, which is specified in box 1402 as RangedDataSet<ParentDataSet>. This implementation 1400 enables memory-efficient subsampling of instances defined by a starting index and an ending index. Moreover, function call overhead is reduced by inlining the steps of FIG. 14. Box 1402 illustrates that RangedDataSet has a single template argument ParentDataSet where ParentDataSet is some other class implementing the MLDataSet concept, and a plurality of member variables: parent, which is a pointer to a ParentDataSet object containing the instances of the subsample that IndexedDataSet<ParentDataSet> represents; starting_instance_index, which is an index of the instance in the parent that represents the first instance in the subsample defined by the IndexedDataSet<ParentDataSet>; and ending_ instance_index, which is an index of the instance in the parent that represents the last instance in the subsample defined by the IndexedDataSet<ParentDataSet>. IndexedDataSet<ParentDataSet> has two typedefs, feature_type is mapped to the type ParentDataSet::feature_type, and label_type is mapped to the type ParentDataSet::label_ type as illustrated in boxes 1434 and 1436.

Procedure 1404 illustrates a non-static class method that retrieves individual feature values given an instance index (instance_index) and a feature index (feature_index), and returns the feature value in a variable value of type feature_type. In Step 1406, the feature value corresponding to instance with instance index ptr->indices[instance_index] and feature index feature_index is assigned to val. It assigns value to ptr->parent->get_feature_value(ptr->starting_instance_index+instance_index, feature_index). Following this, procedure 1404 terminates in step 1408. Procedure 1410 retrieves an individual label, returning a value of type label_type. Step 1412 of procedure 1410 retrieves the label ptr->parent->get_label(ptr->indices[instance_index]) indexed and stores it in value, and then terminates in step 1414. Procedure 1416 returns the number of instances in the object pointed to by ptr, which is effectively the size of the subsample represented by the object ptr on ptr->parent. Step 1418 in procedure 1416 sets sz to the value returned by ptr->indices.size( ), and then terminates in step 1420. Procedure 1422 returns the number of classes in the variable sz. Step 1424 in procedure 1422 sets sz to ptr->parent->get_num_classes( ) and terminates in step 1426. Procedure 1428 returns a variable sz representing the number of features in the data set. Step 1430 in procedure 1428 sets the sz variable to ptr->parent->get_num_features( ) and terminates in step 1432.

The DecisionTreeNode concept specifies type constraints and interfaces that all implementing classes must obey. Objects of classes implementing the concept represent decision trees. Some typedefs that must be defined include:
  node_handle—type to refer to child decision tree nodes.
  label_type—type of the labels in a decision tree's leaf nodes, and it also represents the type of a prediction value when the decision tree is applied to a feature_vector.
  test_parameter_type—type of the encoding for the Node Test's parameterization
  threshold_type—type of thresholds used for threshold tests.
  uncertainty_parameterization_type—a type used to parameterize the uncertainty computation when predicting.
  feature_indices_const_iterator—a type of random access iterator used to traverse feature indices when a Node Test involves multiple features.

Implementors of the DecisionTreeNode must also implement the following functions:
  inline handle_type get_left( ) const—returns a handle to the Node's Left Child
  inline handle_type get_right( ) const—returns a handle to the Node's Right Child
  inline int get_feature_index( ) const—returns the feature index used to apply a test
  inline threshold_type get_threshold( ) const—returns the threshold used for threshold tests
  inline uncertainty_type &get_uncertainty_parameters( )—returns the uncertainty parameters used for prediction.
  inline const uncertainty_type &get_uncertainty_parameters( ) const—returns the uncertainty parameters used for prediction as a const reference.
  inline feature_indices_const_iterator fi_begin( ) const—returns a const random access iterator to the first feature index used in the test for the decision tree node
  inline feature_indices_const_iterator fi_end( ) const—returns a const random access iterator to one past the last feature index used in the test for the decision tree node.
  template <class Iterator> inline label_type predict_on_features_iterator(Iterator features_begin, Iterator features_end) const—predicts on a feature vector defined by a random access iterator
  template <class DataSet> inline label_type predict_on_instance_in_data_set(size_t instance_index, const DataSet &data_set)—predicts on a object from a class that implements the MLDataSet concept.

In decision tree learning, a Classification and Regression Tree (CART) algorithm is often used learn a decision tree from a training set. It is a recursive algorithm that starts from the top of the decision tree, and keeps building the tree downward until stopping criteria are met (e.g. the data set has too few instances, the labels in the data set are homogeneous, or no significant increase in the score is achieved). The steps are outlined as follows (start with a tree node T:=root, D:=data set):
1. best_feature_index:=undefined; best_score:=0; best_test:=undefined;
2. k:=0
3. if D has exactly the same label for every instance or there are fewer than node_size instances in D, go to step 6
4. If k<mtry
   a. let f<D.get_num_instances( ) be an integer drawn uniformly at random
   b. find high scoring test (e.g. threshold) p using node learning procedure and some scoring criteria C, restricting consideration to just feature index f. Let this score be s.
   c. if best_score <s then
      i. best_score:=s
      ii. best_feature_index:=f
      iii. best_test:=p
   d. k:=k+1
   e. goto 4
5. If the node learning procedure led to no acceptable increase in score (or decrease in loss, depending on the criteria), goto step 6.
6. Let T be a leaf node. Store the label using a summary statistic computed on D (e.g. the median or mean label). Compute the uncertainty parameters if desired. Restore the caller's state and return to it.

7. Otherwise, store the feature index, threshold, and other learned parameters in T.
8. Partition D into two data sets, with DL representing those instances for which the threshold test passes and DR representing those instances for which the threshold test fails. Create empty trees TL and TR, and attach them as the left node and right node of T, respectively.
9. Recurse to step 1 with D:=DL and T:=TL
10. Recurse to step 1 with D:=DR and T:=TR
11. Restore the caller's state, and return to it.

There are a large number of ways to implement the steps above. Most approaches use a recursive function, but this incurs function call overhead. A priority queue of task objects is employed, where each task object represents the state (D, T). Prior to jumping to step 1, the (DL, TL) and (DR, TR) are enqueued. At step 1, if the queue is empty, we stop and return the tree. If it is nonempty, we simply dequeue the next task object and let it be (D, T). Further, the Instance-indexed Data Set class is used to represent the subset of instances used for training the overall decision tree for the forest. The Instance-indexed Range Data Set, which encodes the partition over the instance indices. Together, this prevents a copy of the entire data set before recursing at step 9 or 10.

A RNG Pool concept is a pool of random number generators where the pool provides a single, dedicated random number generator for each thread of execution.

A class that implements the DecisionTreeLearner concept must be parameterized by a class that implements an RNG Pool, a class that implements a ReadableDataSet, and a class that implements a Splitting Criteria. It must implement the member function template <class label_type> inline Node<label_type> learn(RNGPool &rng_pool, const DataSet &in, const Criteria &criteria, int mtry, int max_depth, int node_size).

The CountMap concept is used in learning decision tree nodes. It records statistics such as the number of instances for each label value it has encountered (for classification), the number of times each category in a categorical feature for each label (for categorical features), and the mean/variance label (for regression). The following functions must be implemented for this concept:

template <class FeatureCache> inline void add_count (const FeatureCache &cache)—adds all instance's feature values in a feature cache to the statistics recorded by the CountMap template <class LabelType> inline void add_count(LabelType label)—updates the statistics curated by the count map by including a single repetition of the label.

template <class LabelType> inline void add_count(LabelType label, int num)—updates the statistics curated by the count map by including a specified multiple of repetitions of a label.

template <class LabelType> inline void remove_count (LabelType label)-updates the statistics curated by the count map by excluding a single repetition of the label.

template <class LabelType> inline void remove_count (LabelType label, int num)—updates the statistics curated by the count map by excluding a specified multiple of repetitions of a label.

There is a different CountMap implementations depending on the type of learning.
    regression and (real-valued or integer features)
    regression and categorical features
    classification and (real-valued or integer features)
    classification and (categorical features)

Static dispatch is used to instantiate the appropriate tree node learning implementation and count map.

The Splitting Criteria concept represents the criteria used to choose the best test among all possible choices or some approximation thereof. It must implement several functions:

template <class CountMap> inline double get_score (const CountMap &left, const CountMap &right)—returns a score such that no progress is made if and only if the score returned is 0. Suppose c is an object from a class C that implements CountMap. Given a threshold test X defined by the CountMap objects leftX and rightX, and a threshold test Y defined by the CountMap object leftY and rightY. The threshold test X is said to be more optimal than threshold test Y if and only if criteria.get_score(leftX, rightX)>criteria.get_score (leftY, rightY).

template <class CountMap> inline double get_overall_impurity(const CountMap &all)—returns the overall impurity given the summary statistics recorded in the object 'all' of a class implementing the CountMap concept.

template <class CountMap> inline double get_impurity (const CountMap &left, const CountMap &right)—returns the impurity given the summary statistics for those instances that passed the test (i.e. the left input) and the summary statistics of those instances that failed the test (i.e. the right input).

inline double get_improvement(double overall_impurity, double test_impurity)—returns a statistic representing the improvement in impurity induced by the test.

The FlexiAlg concept is used to analyze the characteristics of an InstanceCache or FeatureCache and dispatches a sort or partitioning algorithm that is deemed to be the most efficient given those characteristics. It uses a mixture of partial template specialization on the type of the labels and the type of the features as well as analyzing the density or histogram of the features given different values of labels in its heuristic.

The TreeNodeLearner concept represents an object that learns a Decision Tree. A subset of its template parameters encode types that implement a Data Set concept, a Splitting Criteria concept, a Count Map concept, and a TreeNode concept. It implements a single function: inline LearnTreeResult learn_tree_node(DataSet &data, const SplittingCriteria &criteria, const CountMap &all, int feature_index). FlexiAlg is used to rearrange or sort the instance cache using the most efficient sort given both the static and dynamic characteristics of the data set. It also must define a child class LearnTreeResult that stores the parameters for the best performing test, the best loss or score, the average loss or score, and the worse loss or score.

There are many different kinds of data that may be trained using an Ensemble of Decision Trees (EDT). For example, an insurance claim may contain the person's date of birth (date), the number of days they've been a customer (integer), and their sex (Male, Female). Each column may consist of real numbers, integers, Booleans, or categories. Though conceptually simple, in practice, supporting such heterogeneity is very difficult. The vast majority of existing implementations of an EDT support training only on numeric data. This limits their applicability for many real world data sets. In another aspect, the present invention also provides mechanisms that enable training an EDT on such data sets without a significant performance penalty.

For ease of explanation, consider the term Variable Characteristic Type (VCT) to refer to the semantic type of the feature values (e.g. dates, real numbers, Booleans, integers, and categories), not the data type (e.g. int32, int64). For example, a date VCT could be encoded with a 64-bit integer that represents seconds elapsed since Jan. 1, 1970 midnight GMT or a Unicode string of date string in ISO 8601 format. For a real number, one can approximate it with a 32-bit or 64-bit float, but other data types may be used as well. For categories, integers may be used with enough bits to encode every possible category of interest to us (8-bit gives a limit of 256 categories). Some choices of data type offer performance benefits, others allow for the conservation of space. An appropriate choice depends on the use case.

The term Variable Data Type (VDT) refers to the type of data used to store a single feature value. When inducing a decision tree node, a specific training algorithm X must be designed to exploit the domain knowledge and semantics of each VCT but the same generic implementation can be used for multiple VDTs with the same VCT. This applies to other algorithms as well, including caching data into contiguous buffers, statistics computation, and specialized sorting. Variable Group Storage Characteristics (VGSC) define how the VDTs are stored—some variable groups may be sparse, some may be contiguously laid out in memory, others may be dis-contiguous, etc.

AlgRepo is a repository that holds a single implementation of an algorithm intended for one VCT, but holds instantiations for different VDTs. The AlgRepo repository serves the following purposes:
    instantiate implementations of algorithms for the same VCT and different VDTs;
    assign a unique integral code to each implementation at compile time; and
    retrieve an implementation at run-time from its runtime code The MLDataSet concept above supports only one VCT at a time, and therefore is suitable in the EDT training procedure for problems where all features are numerical or all features are categorical—in other words, where data is homogenous and never mixed, rather than heterogeneous. The present invention therefore includes a heterogeneous data aspect that allows an EDT to be trained on data where the VCT may vary from column to column.

In such an aspect of the present invention, multiple columns with exactly the same VCT and VDT can be grouped together in an object that is an instance of the class VariableGroup. This VariableGroup is represented as a C++ concept, similar to the MLDataSet concept described above. However, no explicit distinction is made between labels and features in such a VariableGroup.

Each column in the VariableGroup represents a single "variable", and that variable may represent a feature, label, instance weight, or even a cost for incorrect prediction. The context in which a reference to a variable is used indicates its purpose. This allows us much greater flexibility in the kinds of algorithms that can be developed. For example, the column treated as a label may be changed by using a different index to refer to the label. Rather than referring to columns as features as for homogeneous data, for heterogeneous data the columns are generically referred to as "variables" so as to not bias their intended purpose. Every variable within the same VariableGroup has exactly the same VCT.

A Heterogeneous Data Set (or, HeteroDS) is a collection of VariableGroup objects of different VCTs, VDTs and VGSCs, and dispatches the same operation to all VGs in the same set of data. A HeteroDS also computes and maintains data set-wide statistics. Every variable in the HeteroDS is represented by a canonical index, and every VariableGroup has a variable group index. Moreover, a variable within a VariableGroup has a within group index. All three of these indexes are combined into a single data structure called a VariableRef, which is comprised of:
    Variable Group Index: the index of a variable group within a HeteroDataSet;
    Within Group Index: the index of a variable within a variable group;
    Canonical Variable Index: the index of a variable for the entire HeteroDS.

A HeteroDS can retrieve any variable by passing a VariableRef. It maintains an ownership flag so that when true, all VariableGroups contained inside of it are automatically deleted when the containing HeteroDS is deleted, and when false, no deletion is performed when the containing HeteroDS is deleteded. The HeteroDS has the following member functions:
    DataSet( )—The constructor builds an empty DataSet object (initially no VariableGroups) with the ownership flag set to false.
    ~DataSet( )—Calls clear( ).
    void set_ownership(bool k)—Sets the variable group ownership flag to the value of k.
    bool get_ownership( ) const—Returns the variable group ownership flag.
    void add_variable_group(BaseVariableGroup *group)— Adds a new VariableGroup to the HeteroDS object. It must contain the same number of instances as all previous variable groups added to the object (if applicable).
    size_t get_num_variables( ) const—Returns the total number of variables in the data set object, which is the same as the sum of the v_get_num_variables( ) applied to every variable group object in the HeteroDS object.
    size_t get_num_instances( ) const—Returns the total number of instances in the HeteroDS. Every variable group must return exactly the same value for get_num_instances( ).
    size_t get_num_variable_groups( ) const—Returns the number of variable groups in the HeteroDS object.
    VariableRef get_variable_ref(size_t canonical_variable_index) const—Returns a VariableRef object that gives the 3 indices to locate the variable in the DataSet, its the variable group, and the variable within the variable group.
    void clear( )—If the ownership flag is set to true, the variable groups in the HeteroDS are deleted.
    size_t get_num_variables_in_variable_group(const VariableRef &ref) const—Returns the number of variables in the variable group specified by the VariableRef passed.
    void compute_downcasting( )—Determines the downcasting to perform on variable values in-flight when caching a variable in the heterogeneous cache. This is called exactly once after all variable groups of the HeteroDS are passed to it. This is effectively achieved by calling v_compute_downcasting( ) on every variable group in the HeteroDS object.
    void assume_no_downcasting( )—An alternative to compute_downcasting, this function ensures that no variables in the HeteroDS are downcasted in-flight when cached into a HeterogeneousCache.
    void compute_summaries( )—Computes summaries on every variable group object in the HeteroDS object. This is effectively achieved by calling v_compute_summary( ) on every variable group in the HeteroDS object.

Figure 4:
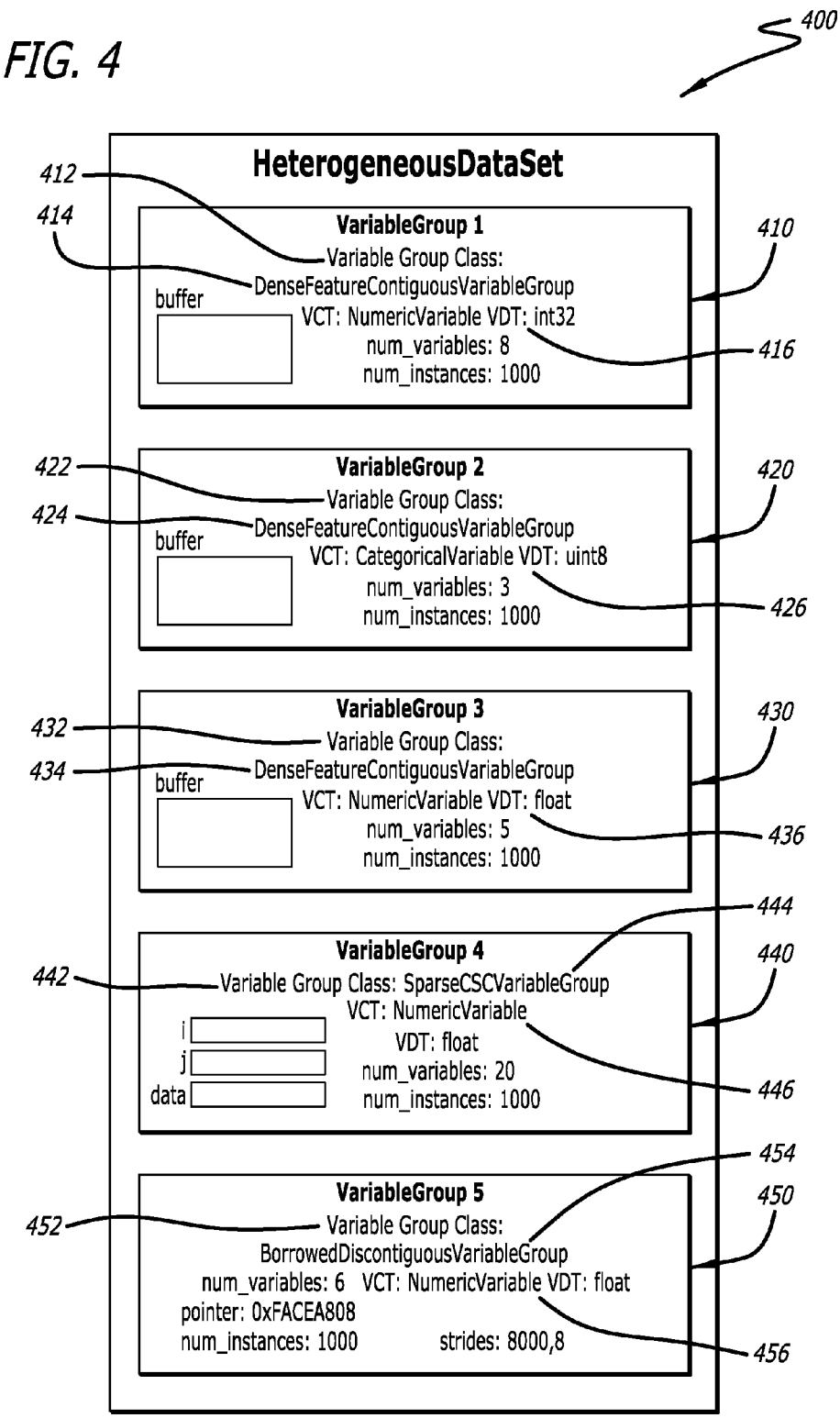
FIG. 4 is a block diagram of a heterogeneous dataset for processing according to another embodiment of the present invention.

FIG. 4 is an exemplary diagram of a heterogeneous dataset 400 (HeteroDS) showing five (5) Variable Groups 410, 420, 430, 440 and 450, containing 42 variables in total and 1000 instances. Each Variable Group includes a Variable Group Class 412, 422, 432, 442, and 452. With regarding to FIG. 4, if an attempt is made to add a VariableGroup that has an inconsistent number of instances, an error results. There are three different implementations of a VariableGroup concept used in the example: DenseFeatureContiguousVariableGroup 414 (indicated in other Variable Groups as 424 and 434), SparseCSCVariableGroup 444, and BorrowedDiscontiguousVariableGroup 454. Two VCTs are represented: NumericVariable 416 (indicated for other VariableGroups as 436, 446, 456) and CategoricalVariable 426 with different VDT encodings.

Figure 5:
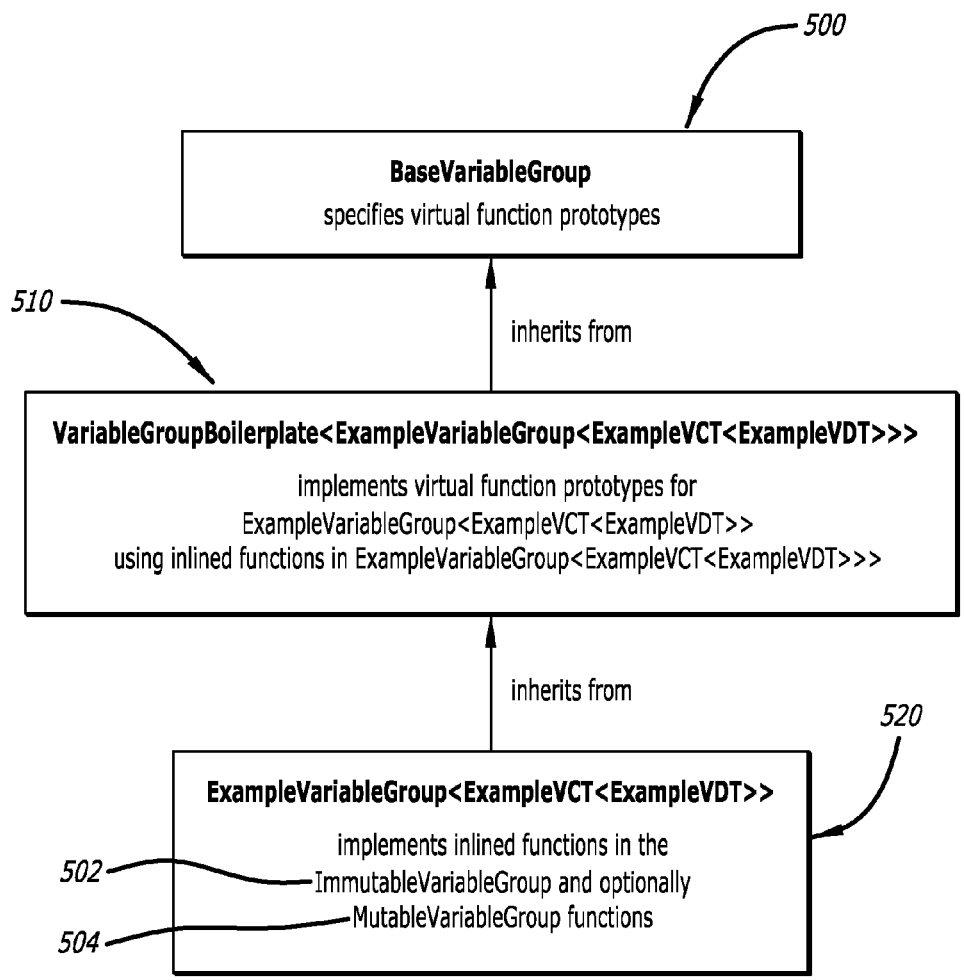
FIG. 5 is an exemplary block diagram illustrating inlining functions for a heterogeneous dataset as in FIG. 5.

FIG. 5 is a block diagram illustrating inlining functions for a class ExampleVariableGroup<ExampleVCT<ExampleVDT> that implements either the ImmutableVariableGroup 502 and potentially MutableVariableGroup 504. All classes implementing ImmutableVariableGroup 502 or MutableVariableGroup 504 must inherit from BaseVariableGroup 500, which is a C++ base class and which specifies virtual function prototypes. A class implementing the ImmutableVariableGroup 502 concept must provide a single typedef: the variable_type as well as the following functions:

- size_t get_num_variables( ) const—returns the total number of variables in the variable group
- size_t get_num_instances( ) const—returns the total number of instances in the variable group
- const variable_type &operator ( )size_t instance_index, size_t variable_index) const—returns the variable value of the given instance index and variable index
- int get_variable_type_code( ) const—returns a unique integer for the variable type, which is used, among other things, for dynamic dispatch of algorithms in an AlgRepo.

A MutableVariableGroup 504 defines an additional function in addition to those above:

- variable_type &operator( )(size_t instance_index, size_t variable_index)

As suggested above, the functions in a class X that implements either the ImmutableVariableGroup 502 and MutableVariableGroup 504 may be inlined. However, calling these functions so inlining is possible must be on X rather than X's derived type. Functions called infrequently may not benefit from inlining, and it may hurt performance, so the dynamic dispatch technique is used. The BaseVariableGroup 500 class has the following pure virtual methods:

- virtual int v_cache_feature_column(const VariableRef &ref, const RangedSubsample<IndexedSubsample> &subsample, FeatureLabelCache &cache) const=0. Caches the variable referenced by ref into the heterogeneous cache as the active feature column in the cache.
- virtual int v_cache_labels(const VariableRef &ref, const AllSubsample &subsample, FeatureLabelCache &cache) const=0. Caches the variable referenced by ref into the heterogeneous cache as the active label column in the cache.
- virtual void v_cache_counts(const VariableRef &ref, const AllSubsample &subsample, FeatureLabelCache &cache) const=0. Caches the variable referenced by ref into the heterogeneous cache as the active multiplicity column in the cache.
- virtual void v_cache_labels(const VariableRef &ref, std::vector<size_t> &cache) const=0. Caches the variable referenced by ref into a pre-allocated Standard Template Library vector as nonnegative, integral labels.
- virtual void v_cache_labels(const VariableRef &ref, std::vector<float> &cache) const=0. Caches the variable referenced by ref into a preallocated Standard Template Library vector as floating-point labels.
- virtual size_t v_get_num_instances( ) const=0. Returns the number of instances in the variable group. This (less efficient) form is used when the derived type is not available.
- virtual size_t v_get_num_variables( ) const=0. Returns the number of variables in the variable group. This (less efficient) form is used when the derived type is not available.
- virtual int v_get_variable_type_id( ) const=0. Returns a unique integral value that represents the type of the elements stored in the variable group. This value is often used for dispatch.
- virtual void v_compute_summary( )=0. Compute summary statistics of the variable group's columns to assist algorithms
- virtual void v_compute_downcasting( )=0. Determines in-flight downcasting to perform during all future cache requests of variables in this variable group.
- virtual void v_assume_no_downcasting( )=0. Avoids in-flight downcasting on all future cache requests of variables in this variable group.
- virtual size_t v_partition(size_t within_group_variable_index, float threshold, RangedSubsample<IndexedSubsample> &subsample) const=0—Partitions the RangedSubsample given a threshold and the index of the variable on which to apply the threshold within the target variable group.
- virtual size_t v_partition(size_t within_group_variable_index, const std::vector<bool> &subset, RangedSubsample<IndexedSubsample> &subsample) const=0. Partitions the RangedSubsample given a bitset and the index of the variable on which to apply the subset membership tests within the target variable group.
- virtual bool v_is_categorical( ) const=0—Returns whether this variable group stores categorical variables.
- virtual GenericVariableSummary v_get_variable_summary(const VariableRef &) const=0. Returns the summary for the variable referenced.
- virtual void v_cache_feature_vector(size_t instance_index, int32_t *cat_feature_vector, float *num_feature_vector) const=0. Caches all variable values in a Variable Group of a specific instance index into a contiguous buffer for the purpose of using those values as part of a feature vector. If the variable group stores categorical features, these values are cached in cat_feature_vector; otherwise, they're stored in num_feature_vector.
- virtual void v_impute( )=0. Performs missing value imputation on all variables in the variable group.

A developer does not need to implement all the above functions for every implementation of the VariableGroup concept, and to do so may add unnecessary development burden, especially when BaseVariableGroup is extended with new virtual function. For example, an implementation ExampleVariableGroup<ExampleVCT<ExampleVDT>> of the VariableGroup concept, only needs to implement the small list of functions in the MutableVariableGroup 504 and ImmutableVariableGroup 502 concepts. This is achieved by using the Curiously Recurring Template Pattern (CTRP). By making the class ExampleVCT<ExampleVDT> must inherit from the intermediate base class VariableGroupBoilerplate<ExampleVariableGroup <ExampleVCT<ExampleVDT>>> 510 (or IBC for short) instead of BaseVariableGroup 500. IBC will then inherit from BaseVariableGroup and implement each virtual function specified therein. These functions in IBC can cast the pointer to the target (this) to a ExampleVariableGroup<ExampleVCT<ExampleVDT>>> and benefit from inlining. The intermediate base class VariableGroupBoilerplate< > 510 that uses this list of functions to implement all of the functionality required in the base class BaseVariableGroup's list of virtual functions.

FIG. 5 is a block diagram that describes how such a process works. The VariableGroup implementation ExampleVariableGroup 520 implements the four inlined functions specified in ImmutableVariableGroup 502 and the one inlined function in MutableVariableGroup 504.

The present invention uses a type to represent each VCT. The type takes as one or more template argument a description of the VDT. Then, pattern matching may be performed at the time of compiling on each type to ensure that the appropriate instantiation of an algorithm is dispatched for each combination of VCT and VDT.

This "type-ification" of the VCT and VDT can also be used to prevent program errors. Most implementations use domain-agnostic types (e.g. int, long, float, double) to represent values. A common source of error is performing an operation on a value that is allowed by the domain-agnostic type, but is ill-defined in the domain context. For example, making a "less than" comparison between two categorical values (e.g. Ford and Chevy). By restricting the operations to the domain, type safety is attained.

Four types are defined below, each for a different VCT:
CategoricalVariable<T>: represents a categorical/nominal variable such as gender (Male, Female), car maker (Ford, Honda, Chevy) where only equality comparisons can be performed. No arithmetic is possible with values of this type. Invalid operations will cause the compiler to not compile the program. Native integral types, such as char, int, long, etc. can be used as T.
NumericVariable<T>: represents a numeric variable such as age or blood pressure. Arithmetic can be performed on values of this type. Any floating point or integral type can be used, e.g. int, float, double, long, char.
DateVariable<T>: represents a date variable where T is some class used to encode dates at the sufficient granularity. Comparisons are allowed. Subtraction between DateVariables yields a DurationVariable. Subtraction between a DateVariable and a DurationVariable yields a DateVariable.
DurationVariable<T, G>: represents a duration where T encodes values and G is a type representing the unit of time. Ordered comparisons are possible.

The present invention also includes a subsampling concept. A subsample represents a subset of instances of a HeteroDS, and repetition among instances is permissible. The subsample data structures reside outside the HeteroDS rather than being incorporated within it, to reduce complication from storing variables in different objects depending on the VCT, VDT, and underlying implementation.

The subsample concept has the following attributes:
size( )—the number of elements (with counting of possible repetition)
get_ancestor_index(size_t i)—retrieves the instance index of the i'th instance in the subsample
get_parent_index(size_t i)—retrieves the instance index Additionally, there are three classes that implement the subsample concept:
AllSubsample—Generates indices 0 . . . N (exclusive) without repetition. Both get_ancestor_index and get_parent_index are idempotent operations.
IndexedSubsample<SubsampleType>—A subsample of some other subsample S of type SubsampleType that implements the subsample type (parent subsample). Stores indices to the parent subsample in an index vector idx. get_ancestor_index(i) returns idx[i]. The size of the subsample is the number of elements in idx.
RangedSubsample<SubsampleType>—A contiguous subsample of some other subsample S of type SubsampleType that implements the subsample type (parent subsample). Stores the lower and upper bound (both <parent->size( ) of the indices. The size of the subsample is upper-lower+1.

With regarding to homogeneous datasets, the present invention includes a traditional data structure to represent decision trees; it looks something like this:

```
struct Node {
    Node *left;
    Node *right;
    float label;
    float threshold;
    long feature_index;
};
```

For heterogeneous data sets, the present invention applies a heterogeneous tree. Nodes can have an arbitrary number of fields, which are associative arrays mapping field names (strings) to fields (or HeteroField). A HeteroField<T> is an array of values of type T, where T be any of the following types:
32-bit floating point number
64-bit floating point number
32-bit integer
64-bit integer
Boolean
variable length bitstring
string This representation is easily extendable to other types.

A heterogeneous tree alleviates several issues associated with applying the traditional data structure to represent decision trees above to homogeneous data sets. In the traditional representation, using a fixed-sized struct to represent leaf and nonleaf nodes, is not as efficient as it could be for certain data, as the "label" field is only needed in leaf nodes, whereas the "threshold" and "feature_index" fields are only needed in nonleaf nodes. In addition, the left and right pointers point to other nodes for nonleaf nodes but point to NULL for leaf nodes.

If a specialized algorithm needs to store more context or info, it cannot be incorporated in the tree nodes unless the struct is changed. Also, new versions of the struct cannot be read into old versions of the software. This makes it difficult to extend the present invention while maintaining backwards compatibility and conservation of space. Moreover, the nodes can be far from each other in memory leading to less locality of reference, which may impact computational performance.

Figure 6:
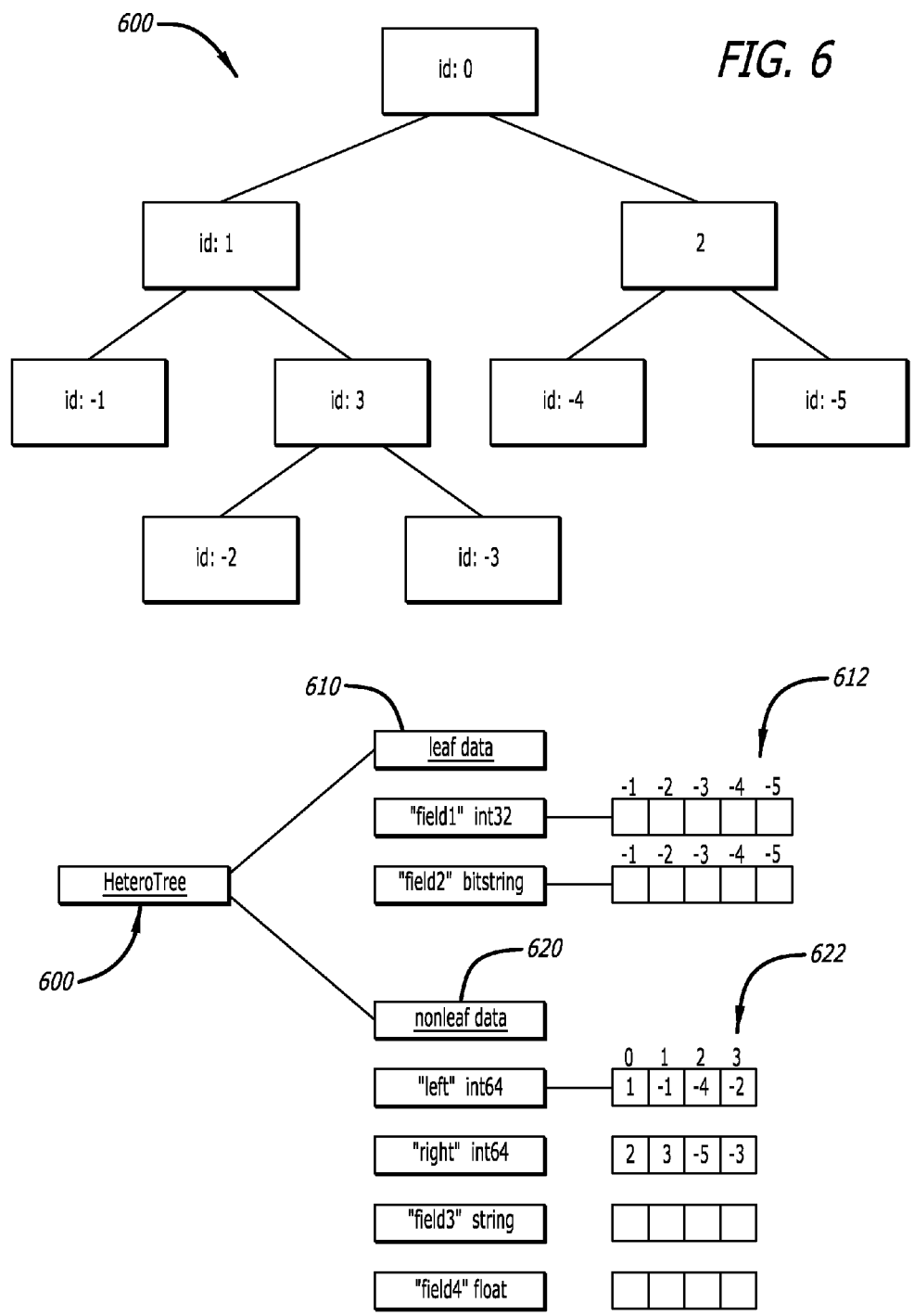
FIG. 6 is a block diagram illustrating application of a heterogeneous tree using a heterogeneous dataset according to the present invention.

FIG. 6 is a block diagram illustrating application of a heterogeneous tree 600. By applying a heterogeneous tree 600, no distinction is made between leaf and nonleaf nodes in the node's type. As FIG. 6 illustrates, leaf nodes 610 are indexed with negative numbers 612, and nonleaf nodes 620 are indexed with nonnegative numbers 622. Each field is an array of values where every value has exactly the same type. Every nonleaf node must store "left" and "right" fields by convention.

It is to be noted from FIG. 6 that space is saved by not storing pointers to the left and right children for leaf nodes 610. Common fields stored in leaf nodes 610 in Decision Trees for heterogeneous datasets are as follows:

"label": 32-bit float for regression, 32-bit int for classification

"mean" (optional): the mean label value of instances following into the leaf node as a 32-bit float "variance" (optional): the variance of the label value of instances following into the leaf node as a 32-bit float "nlabel0", "nlabel1", . . . (optional): the value of the first, second, etc. histogram bins as a 32-bit or 64-bit integers. This field can be used to store the histogram of labels for training instances that fall into a particular leaf node. This can be used to change the voting process so that each leaf node casts a vote for a label i (for example) using the value of histogram bin i (stored in nlabeli).

"expXsquared" (optional): the expectation of floating point label values that are squared. This can be used to reconstruct the variance of the labels for the instances that fell into a particular leaf node during training or assist in estimating the uncertainty of a regression.

Figure 7:
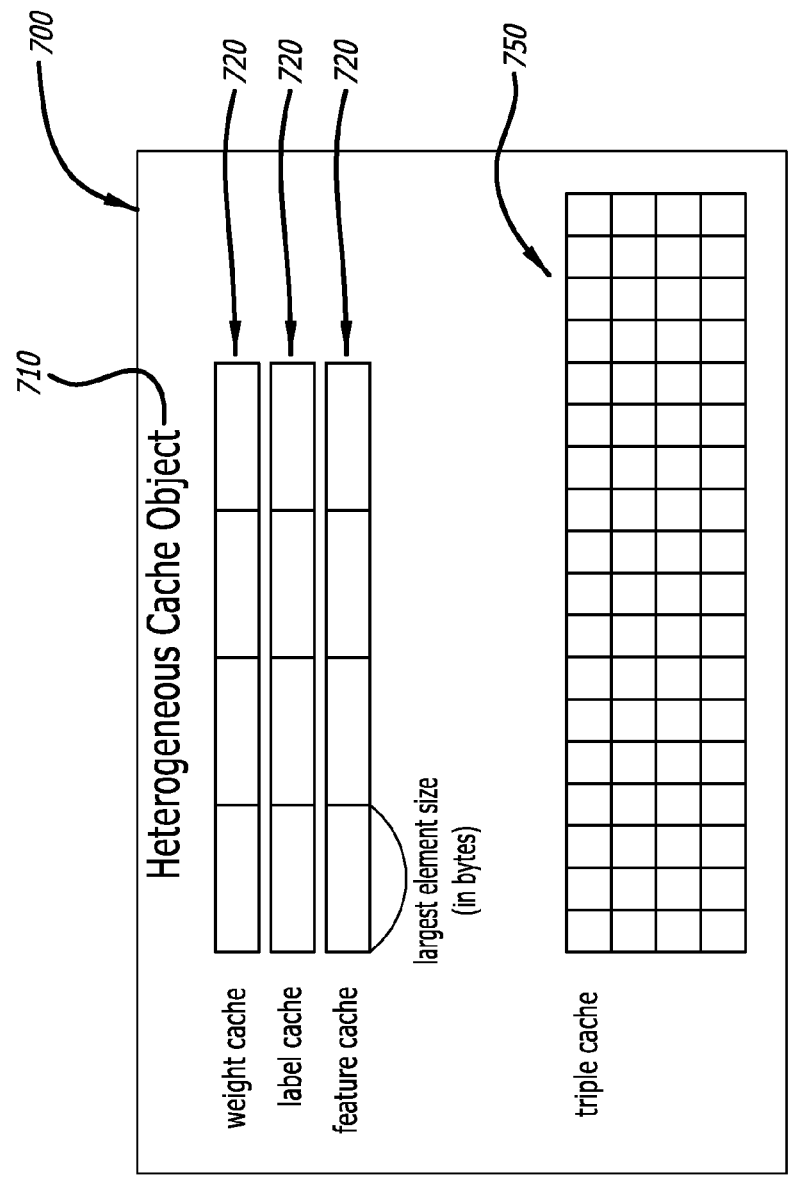
FIG. 7 shows an example of buffers in a heterogeneous cache object for storing a heterogeneous dataset according to the present invention.

A HeteroDS enables variables to have different VCTs and VDTs. Moreover, the (VCT, VDT) combination can vary in implementation, i.e. the class implementing ImmutableVariableGroup and MutableVariableGroup concepts can be different. This poses a challenge in writing algorithms that operate on values from more than one variable—retrieving the values from the two different variables via dynamic dispatch mechanisms is costly. FIG. 7 is a block diagram illustrating a heterogeneous cache 700 (HGCache), which is an intermediate data structure to hold variable values contiguously in memory with simple striding so that the tree node induction is agnostic to the VCT, VDT, and Variable Group implementation details.

FIG. 7 shows an example of a heterogeneous cache object 710 in a heterogeneous cache 700. It has four buffers 720, 730, 740, and 750, and data from VariableGroup objects are copied into the first three buffers 720, 730 and 740 to populate them as follows. Weight cache 720 stores weights for instances involved in a split induction (determined by a bootstrapped or a non-bootstrapped sample). This buffer 720 is allocated so it is aligned to the word boundary of the widest VDT as well as the cache line boundary and contains enough bytes to store enough VDT elements to hold all weights for a sample.

Label cache 730 stores labels for instances involved in a split induction. This buffer 730 is allocated in a similar fashion to the weight cache 720. Feature cache 740 stores features for instances involved in a split induction. This buffer 740 is allocated in a similar fashion to the weight cache 720. Triple cache 750 stores enough bytes to hold (feature, label, weight) triples for all instances in a sample on a HeteroDS.

Figure 8:
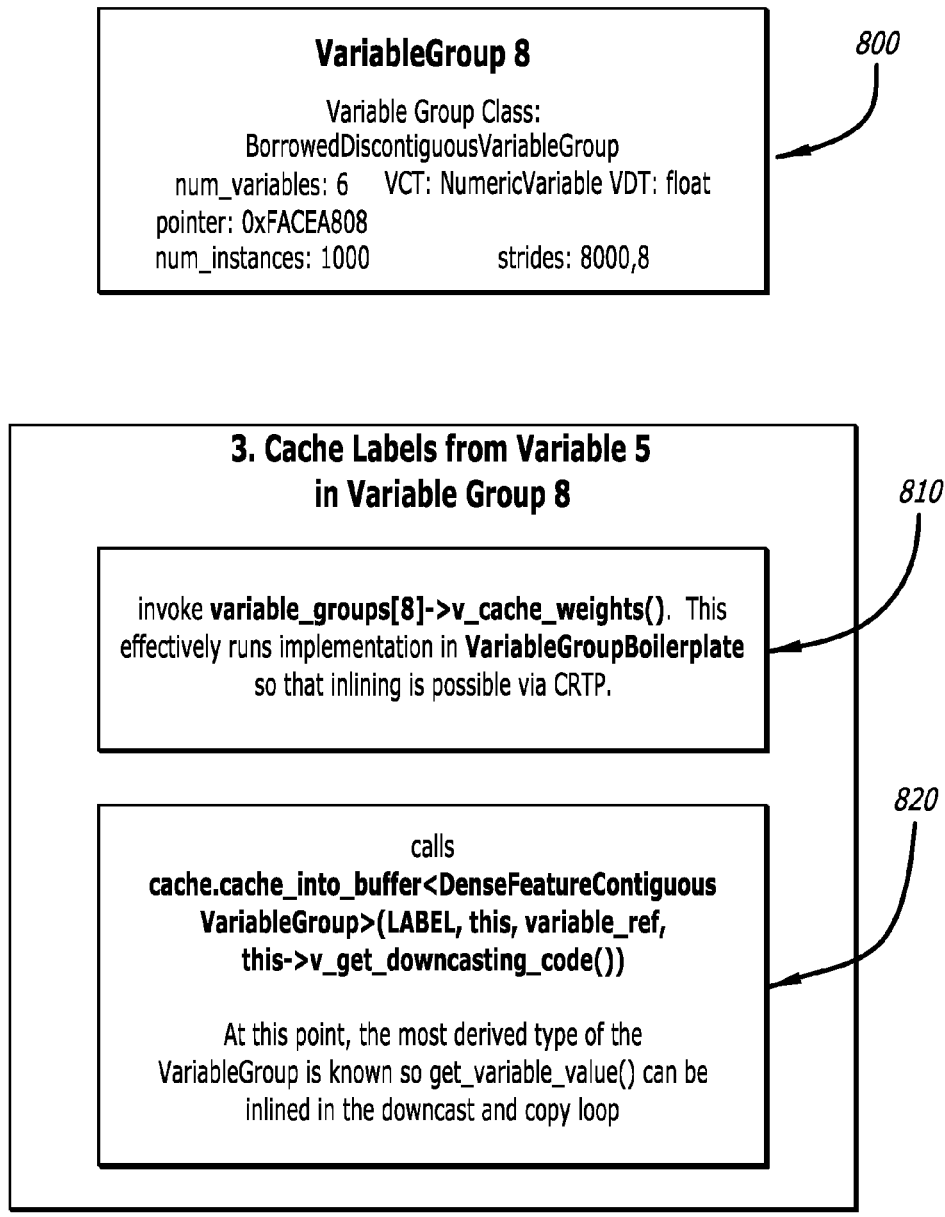
FIG. 8 is an exemplary block diagram illustrating of caching of weights prior to populating a triple buffer for a heterogeneous cache object according to the present invention.
Figure 9:
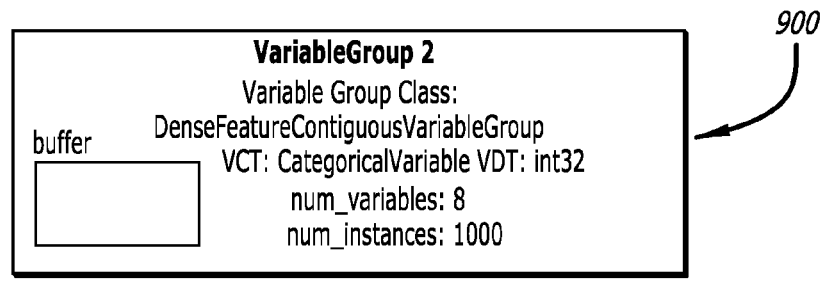
FIG. 9 is an exemplary block diagram illustrating of caching of labels prior to populating a triple buffer for a heterogeneous cache object according to the present invention.
Figure 9:
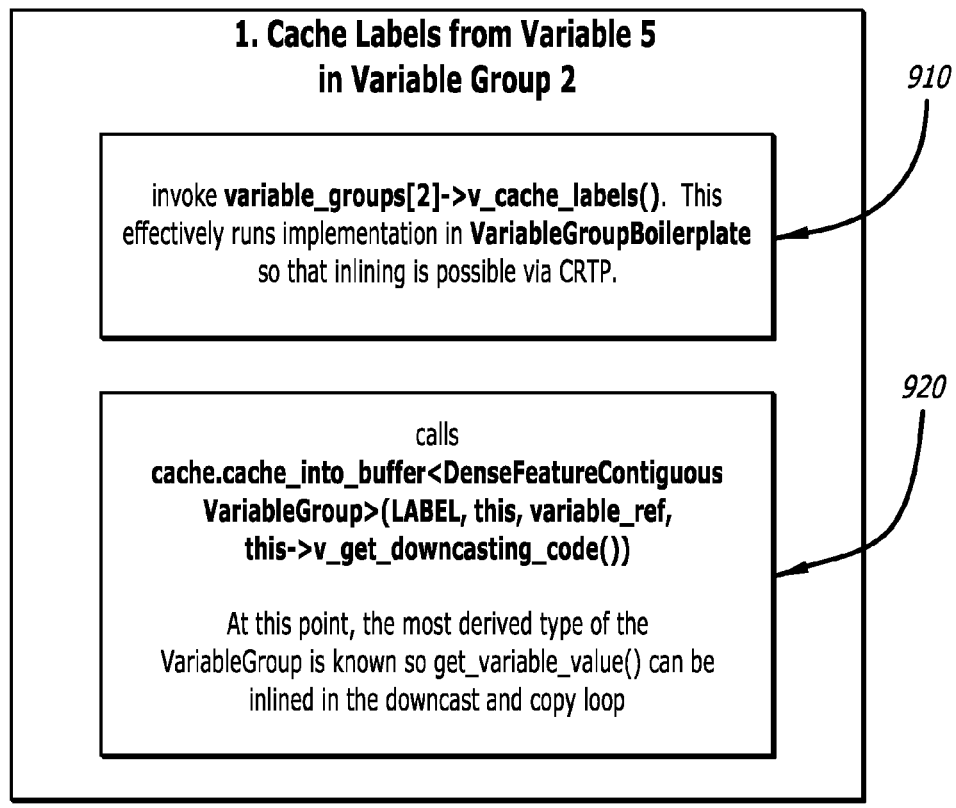
Figure 10:
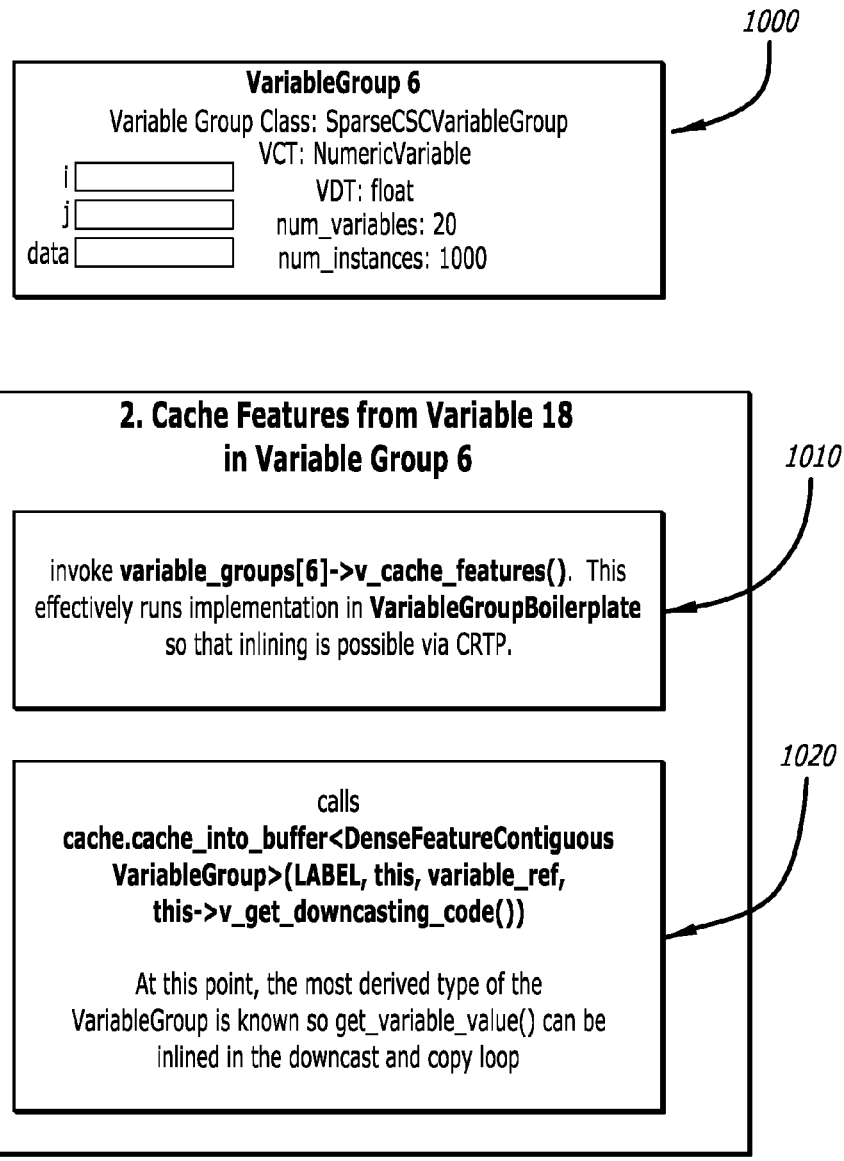
FIG. 10 is an exemplary block diagram illustrating of caching of features prior to populating a triple buffer for a heterogeneous cache object according to the present invention.

For example, a split is induced on a feature stored in a variable with VariableRef feature_ref and the labels stored in a variable with VariableRef label_ref. First, call data_set->get_variable(label_ref)->v_cache_labels(label_ref, s, c) on the cache passing the variable group corresponding to i and call v_cache_features on the cache passing the variable group corresponding to j where s is the heterogeneous cache object that will hold the data and s is an object from a class implementing the Subsample concept. If weighted learning is used so that some instances have more contribution to the error than others in proportion to an instance weight, data_set->get_variable(weight_ref)->v_cache_weights(label_ref, s, c) is called to use the variable referenced for the instance weights. FIGS. 8, 9 and 10 show examples of caching weights, labels, and features prior to populating the triple cache.

Returning to FIG. 7, next the triple cache 750 is populated. Combiner<LabelVG, FeatureVG, WeightVG> is a type that inherits from BaseCombiner and v_combine( ) is a pure virtual function in BaseCombiner and a non-pure virtual function in Combiner<LabelVG, FeatureVG, WeightVG>. Build an AlgRepo on all valid combinations of LabelVG, FeatureVG, WeightVG. Dispatch the appropriate derived Combiner< > based on the integral type codes returned by calling v_get_variable_type_id( ) on the label variable group, feature variable group, and weight variable group. This function copies the elements from the weight, feature, and label buffers 720, 730 and 740 into the fourth buffer 750 where the elements of the fourth buffer 750 are tuples of the form std::tuple<LabelVDT, FeatureVDT, WeightVDT>. Note that none of these buffers (720, 730 or 740) record any info about the VCT or underlying VariableGroup implementation.

An AlgRepo of node induction procedures across every combination of LabelVDT, FeatureVDT, and WeightVDT is built beforehand. Given the integral type codes of the variables recently cached in the combine step, the most compatible node induction procedure is dispatched from the AlgRepo.

As noted above, FIG. 8, FIG. 9, and FIG. 10 are block diagrams illustrating examples of caching weights, labels and features as indicated in FIG. 7 prior to populating the triple cache 750. FIG. 8 shows a VariableGroup 8, labeled as box 800, and steps for caching from Variable 5 in VariableGroup 8. These steps include invoking a weights call function 810, which effectively runs an implementation in Variable Group Boilerplate so that inlining can be performed via CRTP. The process then populates the buffer 720 in step 820.

FIG. 9 shows a VariableGroup 2, labeled as box 900, and steps for caching from Variable 5 in Variable Group 2. These steps include invoking a labels call function 910, which effectively runs an implementation in Variable Group Boilerplate so that inlining can be performed via CRTP. The process then populates the buffer 730 in step 920.

FIG. 10 shows a VariableGroup 6, labeled as box 1000, and steps for caching from Variable 18 in Variable Group 6. These steps include invoking a features call function 1010, which effectively runs an implementation in Variable Group Boilerplate so that inlining can be performed via CRTP. The process then populates the buffer 740 in step 1020.

As noted above, it is contemplated that the systems and methods of the present invention may be implemented using one or more processors and memory components within a computing environment. However, it is to be understood that the systems and methods of implementing a learning ensemble of decision trees in a single-machine environment for homogeneous and heterogeneous datasets according to the present invention may be further implemented in many different computing environments generally. For example, they may be implemented in conjunction with one or more special purpose computers, programmed microprocessors or microcontrollers and peripheral integrated circuit element(s), an ASIC or other integrated circuits, digital signal processor(s), electronic or logic circuitry such as discrete element circuits, programmable logic devices or gate arrays such as a PLD, PLA, FPGA, PAL, and any comparable means. In general, any means of implementing the systems and methods illustrated herein can be used to implement the various aspects of the present invention. Exemplary hardware that may be utilized in one or more embodiments or aspects of the present invention includes computers, handheld devices, telephones (e.g., cellular, Internet enabled, digital, analog, hybrids, and others), and other such hardware. Some of these devices include processors (e.g., a single or multiple microprocessors), memory, nonvolatile storage, input devices, and output devices. Furthermore, alternative software implementations including, but not limited to, distributed processing, parallel processing, or virtual machine processing can also be configured to perform the systems and methods described herein.

The systems and methods of the present invention may also be partially implemented in software configured to execute one or more routines, functions, or algorithms, and that can be stored on a storage medium, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Additionally, the data processing routines, functions and algorithms disclosed herein may be performed by one or more program instructions stored in or executed by such memory, and further may be performed by one or more modules configured to carry out those program instructions. Modules are intended to refer to any known or later developed hardware, software, firmware, artificial intelligence, fuzzy logic, expert system or combination of hardware and software that is capable of performing the data processing functionality described herein.

The foregoing descriptions of embodiments of the present invention have been presented for the purposes of illustration and description. It is not intended to be exhaustive or to limit the invention to the precise forms disclosed. Accordingly, many alterations, modifications and variations are possible in light of the above teachings, may be made by those having ordinary skill in the art without departing from the spirit and scope of the invention. It is therefore intended that the scope of the invention be limited not by this detailed description. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A method comprising:
implementing, within a single-machine computing environment comprised of hardware and software components that include at least one processor, the steps of:
integrating function code into a caller's code to inline relevant statements so that repetitive pushing and popping of a collection of variables having different variable characteristic types, variable data types, and variable group storage characteristics to and from a stack at each compilation is eliminated, wherein a data structure in which a set of heterogeneous data is comprised of a collection of variables having different variable characteristic types, variable data types, and variable group storage characteristics is defined so that multiple columns with exactly the same variable characteristic types and variable data types are grouped together as a variable group, where each variable is represented by a canonical index, and each variable group has a variable group index, and each variable within a variable group has a within group index;
instantiating a subsample of data structures representing a subset of instances of a set of heterogeneous data, wherein the subsample of data structures reside outside of the variable group to reduce complication from storing the collection of variables having different variable characteristic types, variable data types, and variable group storage characteristics;
defining an intermediate data structure to represent the collection of variables contiguously to place bytes required for compilation in a contiguous arrangement so that fewer pages of data are pulled from memory to blocks in a plurality of caches that include a weight cache, a label cache, a feature cache, and a triple cache; and
representing each variable characteristic type by a type that describes a variable data type in one or more template arguments to enable pattern matching at a node induction and statistics computation time on each type so that an appropriate instantiation of a routine is directed for each combination of variable characteristic type and variable data type.

2. The method of claim 1, wherein the variable group index is an index of a variable group within a set of heterogeneous data.

3. The method of claim 1, wherein the within group index is an index of a variable within a variable group in a set of heterogeneous data.

4. The method of claim 1, wherein the canonical variable index is an index of a variable within a set of heterogeneous data.

5. The method of claim 1, wherein the representing each variable characteristic type by a type that describes a variable data type in one or more template arguments further comprises representing a variable characteristic type by a categorical variable type for nominal categorical variables.

6. The method of claim 1, wherein the representing each variable characteristic type by a type that describes a variable data type in one or more template arguments further comprises representing a variable characteristic type by a numeric variable type for numerical variables.

7. The method of claim 1, wherein the representing each variable characteristic type by a type that describes a variable data type in one or more template arguments further comprises representing a variable characteristic type by a date variable type for date variables.

8. The method of claim 1, wherein the representing each variable characteristic type by a type that describes a variable data type in one or more template arguments further comprises representing a variable characteristic type by a duration variable type for variables representing units of time.

9. The method of claim 1, further comprising applying a heterogeneous tree to index negative values and nonnegative values in a plurality of fields, each field forming an array of values where every value in the same field has exactly the same type.

10. The method of claim 1, wherein the weight cache stores weights for instances involved in a split induction, the label cache stores labels for instances involved in a split induction, the feature cache stores features for instances involved in a split induction, and the triple cache stores enough bytes to hold (feature, label, weight) tuples so that data needed for node induction is arranged in a manner that improves spatial and temporal locality of reference for all instances in a sample of data within the set of heterogeneous data.

11. The method of claim 1, wherein the contiguous arrangement reduces the delay associated with cache misses by improving the spatial and temporal locality of reference of data needed for node induction.

12. A system comprising:
a computer processor; and
at least one computer-readable storage medium operably coupled to the computer processor and having program instructions stored therein, the computer processor being operable to execute the program instructions to optimize machine intelligence for implementing a learning ensemble of decision trees in a single-machine environment in a plurality of data processing modules, the plurality of data processing modules configured to:
integrate function code into a caller's code to inline relevant statements so that repetitive pushing and popping of a collection of variables having different variable characteristic types, variable data types, and variable group storage characteristics to and from a stack at each compilation is eliminated, instantiate a subsample of data structures representing a subset of instances of a set of heterogeneous data set, align buffers comprising a plurality of caches to place bytes required for compilation in a contiguous arrangement so that fewer pages of data are pulled from memory to blocks in the plurality of caches, and apply one or more class and function templates to target specific datasets in the initial and additional data structures by representing each variable characteristic type by a type that describes a variable data type in the one or more class and function templates to enable pattern matching at a compilation time on each type.

13. The system of claim 12, wherein a data structure in which a set of heterogeneous data is comprised of a collection of variables having different variable characteristic types, variable data types, and variable group storage characteristics is defined so that multiple columns with exactly the same variable characteristic types and variable data types are grouped together as a variable group, where each variable is represented by a canonical index, and each variable group has a variable group index, and each variable within a variable group has a within group index.

14. The system of claim 13, wherein the subsample of data structures reside outside of the variable group to reduce complication from storing the collection of variables having different variable characteristic types, variable data types, and variable group storage characteristics.

15. The system of claim 13, wherein the plurality of caches include a weight cache, a label cache, a feature cache, and a triple cache.

16. The system of claim 15, wherein the weight cache stores weights for instances involved in a split induction, the label cache stores labels for instances involved in a split induction, the feature cache stores features for instances involved in a split induction, and the triple cache stores enough bytes to hold (feature, label, weight) tuples so that data needed for node induction is arranged in a manner that improves spatial and temporal locality of reference for all instances in a sample of data within the set of heterogeneous data.

17. The system of claim 13, wherein the plurality of data processing modules are further configured to apply a heterogeneous tree to index negative values and nonnegative values in a plurality of fields, each field forming an array of values where every value in the same field has exactly the same type.

18. The system of claim 13, wherein a repository holds all instantiations of a node induction procedure for a plurality of variable characteristic types, variable data types, variable group storage characteristic types, and procedure traits.

19. The system of claim 13, wherein a repository generates a unique integral code for each combination of variable characteristic type, variable data type, variable group storage characteristics, and procedure traits.

20. The system of claim 13, wherein a repository dispatches an instantiation of a node induction procedure for a specific combination of variable characteristic type, variable data type, variable group storage characteristics, and procedure traits by first generating the unique integral code for the combination, retrieving the instantiation based on its unique integral code, and then calling the instantiation.

21. A method of implementing a learning ensemble of decision trees in a single-machine computing environment, comprising:
defining an initial data structure in which a set of heterogeneous data is comprised of a collection of variables having different variable characteristic types, variable data types, and variable group storage characteristics is defined so that multiple columns with exactly the same variable characteristic types and variable data types are grouped together as a variable group, where each variable is represented by a canonical index, and each variable group has a variable group index, and each variable within a variable group has a within group index;

implementing, within a single machine computing environment comprised of hardware and software components that include at least one processor, a compiler optimization routine that determines run time compilation requirements by copying compiled code for a function into a caller's compiled code so that function call overhead from pushing and popping a collection of variables having different variable characteristic types, variable data types, and variable group storage characteristics to and from a stack at each compilation is eliminated;

subsampling additional data structures representing a subset of instances of a set of heterogeneous data for variables residing outside of the variable group to reduce complication from storing the collection of variables having different variable characteristic types, variable data types, and variable group storage characteristics;

aligning buffers comprising a plurality of caches to place bytes required for compilation in a contiguous arrangement so that fewer pages of data are pulled from memory to blocks in the plurality of caches, the plurality of caches including a weights cache, a labels cache, a features cache, and a triple cache; and applying one or more class and function templates to target specific datasets in the initial and additional data structures by representing each variable characteristic type by a type that describes a variable data type in the one or more class and function templates to enable pattern matching at a compilation time on each type so that an appropriate instantiation of a routine is directed for each combination of variable characteristic type and variable data type.

22. The method of claim 21, wherein the implementing a compiler optimization routine enables inlining of one or more of relevant statements, variants and procedures.

23. The method of claim 21, wherein the variable group index is an index of a variable group within a set of heterogeneous data.

24. The method of claim 21, wherein the within group index is an index of a variable within a variable group in a set of heterogeneous data.

25. The method of claim 21, wherein the canonical variable index is an index of a variable within a set of heterogeneous data.

26. The method of claim 21, wherein the weight cache stores weights for instances involved in a split induction, the label cache stores labels for instances involved in a split induction, the feature cache stores features for instances involved in a split induction, and the triple cache stores enough bytes to hold features, labels, and weights for all instances in a sample of data within the set of heterogeneous data.

27. The method of claim 21, wherein the applying one or more class and function templates to target specific datasets in the initial and additional data structures by representing each variable characteristic type by a type that describes a variable data type further comprises representing each variable characteristic type by a type that describes a variable data type in one or more template arguments further comprises representing a variable characteristic type by a categorical variable type for nominal categorical variables.

28. The method of claim 21, wherein the applying one or more class and function templates to target specific datasets in the initial and additional data structures by representing each variable characteristic type by a type that describes a variable data type further comprises representing each variable characteristic type by a type that describes a variable data type in one or more template arguments further comprises representing a variable characteristic type by a numeric variable type for numerical variables.

29. The method of claim 21, wherein the applying one or more class and function templates to target specific datasets in the initial and additional data structures by representing each variable characteristic type by a type that describes a variable data type further comprises representing each variable characteristic type by a type that describes a variable data type in one or more template arguments further comprises representing a variable characteristic type by a date variable type for date variables.

30. The method of claim 21, wherein the applying one or more class and function templates to target specific datasets in the initial and additional data structures by representing each variable characteristic type by a type that describes a variable data type further comprises representing each variable characteristic type by a type that describes a variable data type in one or more template arguments further comprises representing a variable characteristic type by a duration variable type for variables representing units of time.

31. The method of claim 21, further comprising applying a heterogeneous tree to index negative values and nonnegative values in a plurality of fields, each field forming an array of values where every value has exactly the same type.

32. The method of claim 21, further comprising holding, in a repository, all instantiations of a node induction procedure for a plurality of variable characteristic types, variable data types, variable group storage characteristic types, and procedure traits.

33. The method of claim 21, further comprising generating, in a repository, a unique integral code for each combination of variable characteristic type, variable data type, variable group storage characteristics, and procedure traits.

34. The method of claim 21, further comprising dispatching, in a repository, an instantiation of a node induction procedure for a specific combination of variable characteristic type, variable data type, variable group storage characteristics, and procedure traits by first generating the unique integral code for the combination, retrieving the instantiation based on its unique integral code, and then calling the instantiation.

\* \* \* \* \*